US009567971B2

(12) United States Patent
Bassett

(10) Patent No.: US 9,567,971 B2
(45) Date of Patent: Feb. 14, 2017

(54) CONICAL FAN ASSEMBLY FOR USE IN A WIND TURBINE FOR THE GENERATION OF POWER

(71) Applicant: Clifford E. Bassett, Muncie, IN (US)

(72) Inventor: Clifford E. Bassett, Muncie, IN (US)

( * ) Notice: Subject to any disclaimer, the term of this patent is extended or adjusted under 35 U.S.C. 154(b) by 570 days.

(21) Appl. No.: 14/132,446

(22) Filed: Dec. 18, 2013

(65) Prior Publication Data

US 2014/0105743 A1 Apr. 17, 2014

Related U.S. Application Data

(63) Continuation-in-part of application No. PCT/US2012/070999, filed on Dec. 20, 2012, and a continuation-in-part of application No. 13/500,266, filed as application No. PCT/US2010/055613 on Nov. 5, 2010, now Pat. No. 9,291,150.

(60) Provisional application No. 61/578,196, filed on Dec. 20, 2011, provisional application No. 61/258,576, filed on Nov. 5, 2009, provisional application No.
(Continued)

(51) Int. Cl.
*F03D 3/06* (2006.01)
*F03D 3/04* (2006.01)
*F03D 3/02* (2006.01)

(52) U.S. Cl.
CPC .............. *F03D 3/02* (2013.01); *F03D 3/0463* (2013.01); *F03D 3/061* (2013.01); *F05B 2240/132* (2013.01); *F05B 2240/211* (2013.01); *F05B 2250/15* (2013.01); *F05B 2250/232* (2013.01); *F05B 2250/25* (2013.01); *Y02E 10/74* (2013.01)

(58) Field of Classification Search
CPC .............. F03D 3/005; F03D 3/02; F03D 3/04; F03D 3/0409; F03D 3/0418; F03D 3/0427; F03D 3/0436; F03D 3/0445; F03D 3/0454; F03D 3/0463; F03D 3/06; F03D 3/061; F05B 2240/12; F05B 2240/123; F05B 2240/13; F05B 2240/131; F05B 2240/132; F05B 2240/133; F05B 2240/14; F05B 2240/211; F05B 2250/232; F05B 2250/25; F05B 2260/24; F05B 2250/15; Y02B 10/30; Y02E 10/74; Y02E 10/465
See application file for complete search history.

(56) References Cited

U.S. PATENT DOCUMENTS 1,816,971 A * 8/1931 Hoff ...................... F03B 17/061
    415/3.1
4,218,175 A * 8/1980 Carpenter ................. F03D 1/04
    415/219.1

(Continued)

FOREIGN PATENT DOCUMENTS

DE     2920243 A1 * 11/1979 ............... F03D 1/04
DE   102010024223 A1 * 12/2011 .............. F03B 3/121
DE   102012212013 A1 *  1/2014 ........... F03B 17/061

*Primary Examiner* — Gregory Anderson
*Assistant Examiner* — Christopher R Legendre
(74) *Attorney, Agent, or Firm* — C. John Brannon; Brannon Sowers & Cracraft PC

(57) ABSTRACT

A conical fan assembly, having a generally conical support member having an exterior surface and a vertical major axis, and a plurality of generally crescent-shaped fan blades extending from the exterior surface of the support member, wherein the plurality of fan blades define a helix configured to urge a fluid to flow in a spiral flow pattern up and around the support member.

12 Claims, 29 Drawing Sheets

Related U.S. Application Data

61/740,264, filed on Dec. 20, 2012, provisional application No. 61/740,267, filed on Dec. 20, 2012.

(56) References Cited

U.S. PATENT DOCUMENTS

| | | | |
|---|---|---|---|
| 6,206,636 B1* | 3/2001 | Powers | F04D 29/181 |
| | | | 415/220 |
| 6,740,989 B2 | 5/2004 | Rowe | |
| 8,128,337 B2* | 3/2012 | Pezaris | F03D 3/02 |
| | | | 415/191 |
| 8,556,571 B2 | 10/2013 | Cassidy | |
| 9,121,384 B2* | 9/2015 | Lin | F03D 3/005 |
| 9,291,150 B2* | 3/2016 | Bassett | F03D 3/005 |
| 2011/0033288 A1* | 2/2011 | Pezaris | F03D 3/02 |
| | | | 415/208.1 |
| 2014/0105738 A1* | 4/2014 | Bassett | F03D 3/0427 |
| | | | 415/202 |
| 2014/0105743 A1* | 4/2014 | Bassett | F03D 3/0463 |
| | | | 416/126 |

* cited by examiner

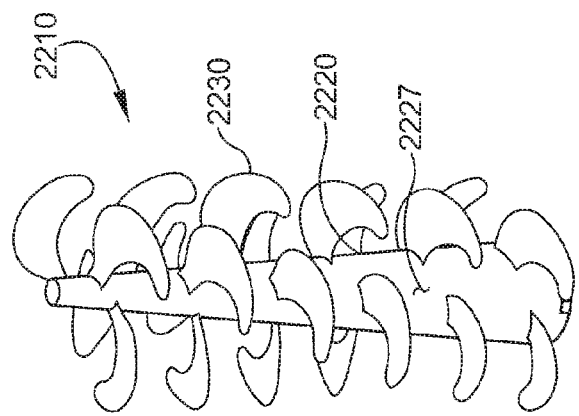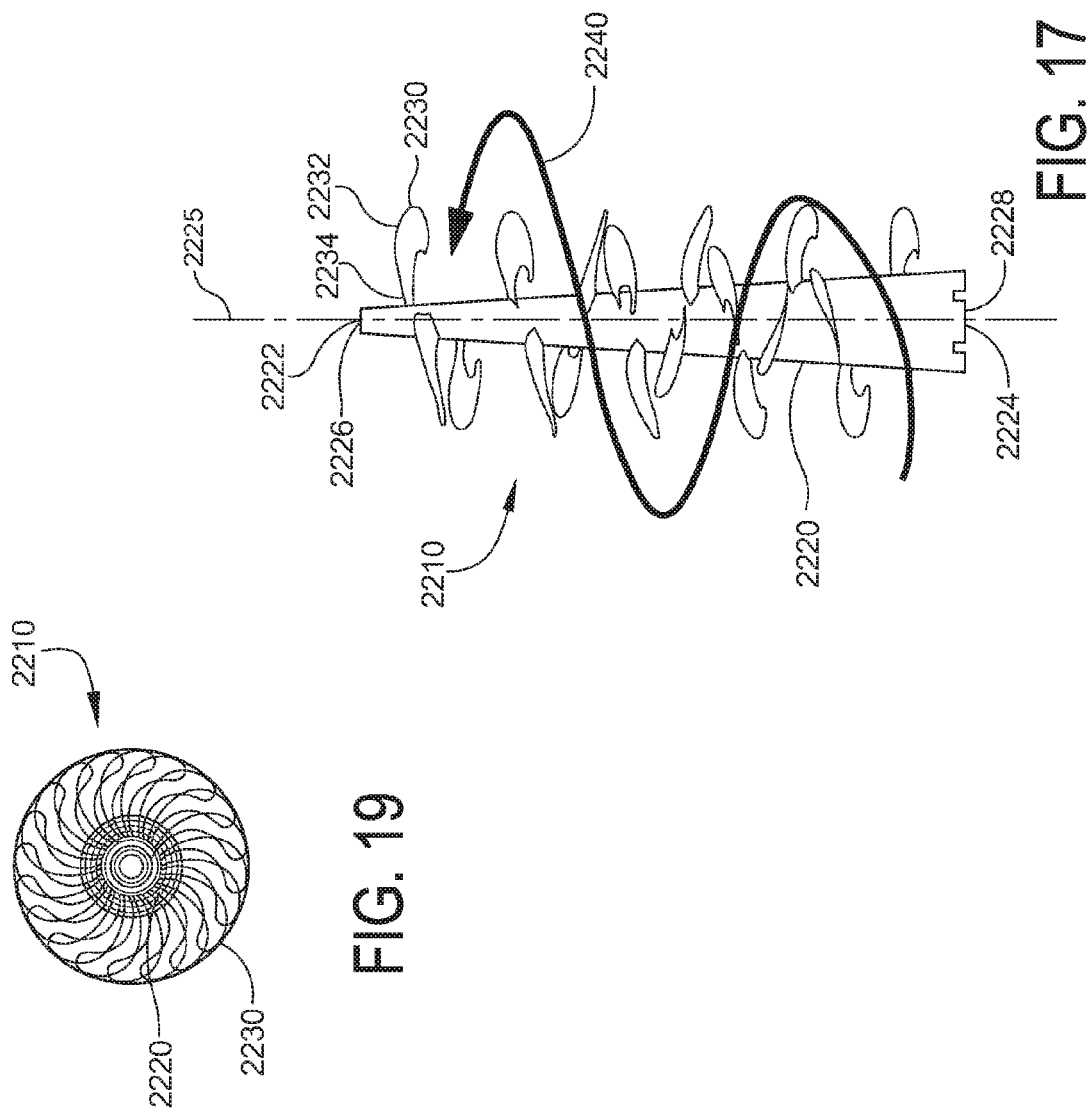

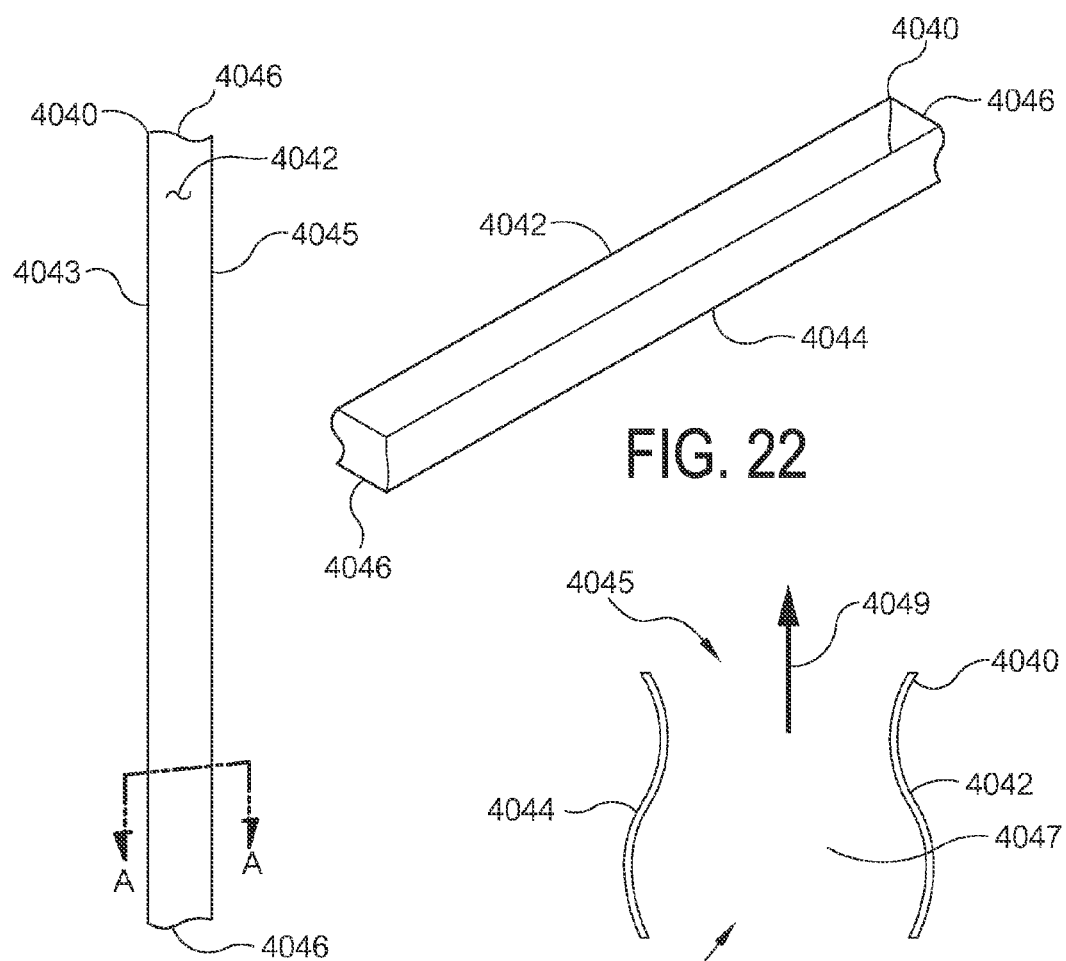

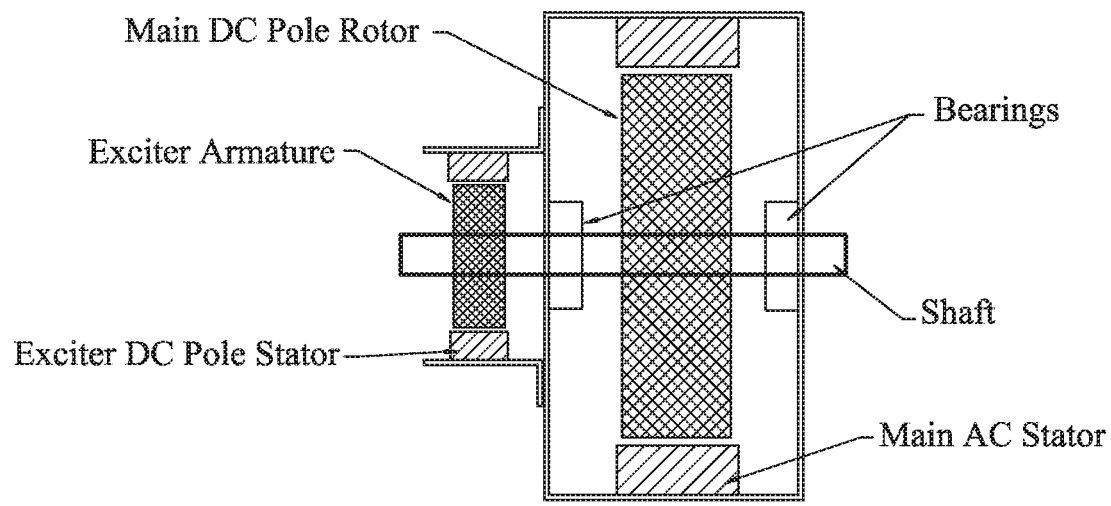
Typical Pancake Configuration
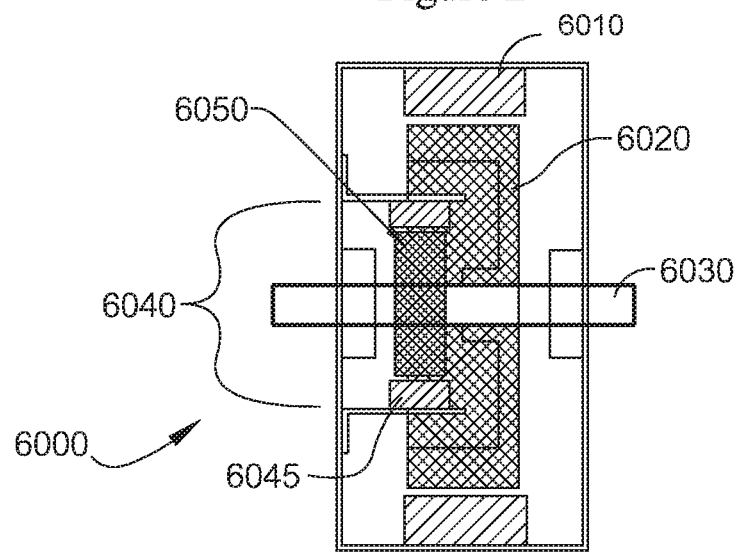
Embedded Pancake Configuration
FIG. 27

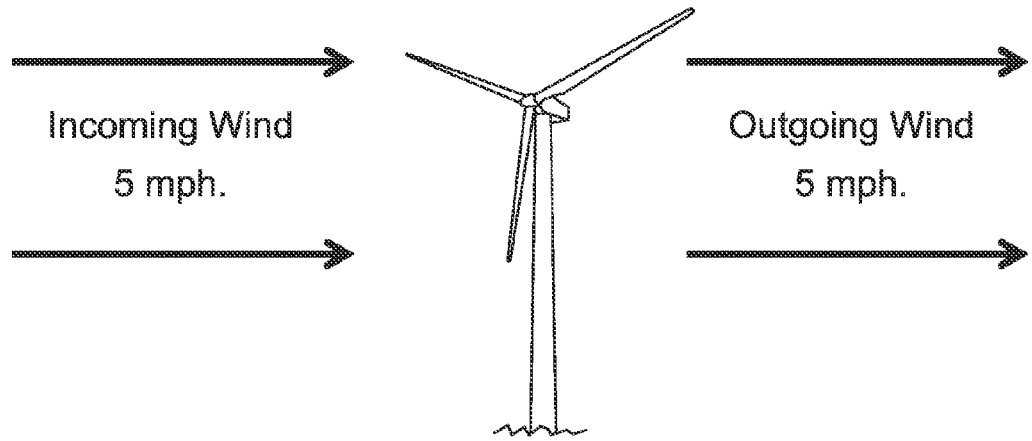
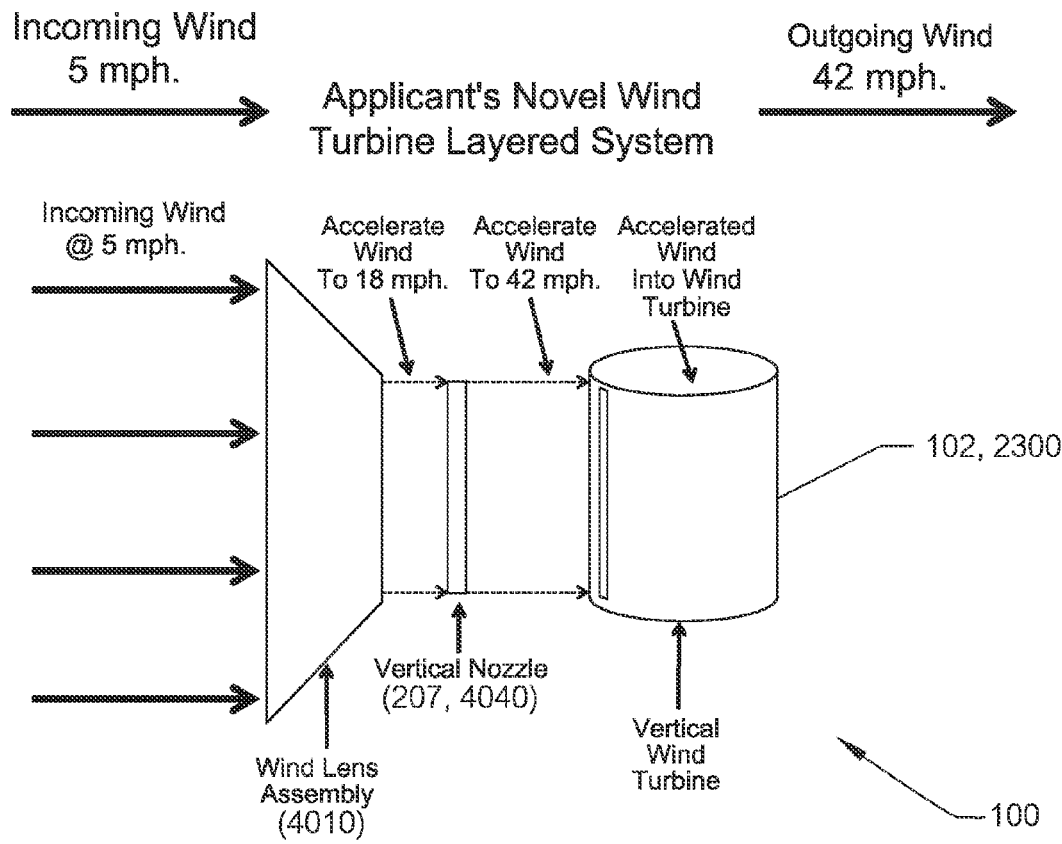
FIG. 28 ion Ser. No. 13/500,266, filed Apr. 4, 2012, which is
CONICAL FAN ASSEMBLY FOR USE IN A WIND TURBINE FOR THE GENERATION OF POWER

PRIORITY

This application (i) is related to, and claims the priority benefit of, Patent Cooperation Treaty Patent Application No. PCT/US2012/070999, filed Dec. 20, 2012, which is related to, and claims the priority benefit of U.S. Provisional Patent Application Ser. No. 61/578,196, filed Dec. 20, 2011, and (ii) is a continuation-in-part of co-pending U.S. patent application Ser. No. 13/500,266, filed Apr. 4, 2012, which is a United States National Phase application of Patent Cooperation Treaty Patent Application Serial No. PCT/US2010/055613, filed Nov. 5, 2010, which claims priority to U.S. Provisional Patent Application Ser. No. 61/258,576, filed Nov. 5, 2009 and (iii) is related to and claims priority benefit of U.S. Provisional Patent Application Ser. Nos. 61/740,264 and 61/740,267, both filed on Dec. 20, 2012. The contents of the above-mentioned applications are hereby incorporated by reference in their entirety into this disclosure.

BACKGROUND

Many devices, such as, for example, turbines, windmills, and the like, function through rotation caused by the flow of a fluid across blades or other features of the device. Oftentimes the velocity of the fluid is less than optimal, or turbulence in the fluid as it flows across the device impairs the efficiency of the output of the device. Thus, there is a need for a system that is capable of redirecting, focusing and accelerating a fluid flow, while introducing minimal turbulence and back pressure, and simultaneously generating rotational momentum in the fan from the fluid flow, with little or no energy and/or efficiency losses arising from turbulence and generated back pressure. The present novel technology addresses this need.

BRIEF DESCRIPTION OF THE DRAWINGS

FIG. 16 shows a perspective view of an embodiment of an exemplary conical fan according to the present disclosure.

FIG. 17 shows a side view of an embodiment of an exemplary conical fan according to the present disclosure.

FIG. 19 shows a plan view of an embodiment of an exemplary conical fan according to the present disclosure.

FIG. 22 shows a perspective view of an embodiment of an exemplary fluid flow nozzle according to the present disclosure.

FIG. 23 shows a side view of an embodiment of an exemplary fluid flow nozzle according to the present disclosure.

FIG. 24 shows a plan cross-sectional view at line A-A of FIG. 23 of an embodiment of an exemplary fluid flow nozzle according to the present disclosure.

FIG. 27 shows an embedded inductance motor for use with the present wind turbine system.

FIG. 28 graphically compares a prior art wind turbine to one embodiment of the present wind turbine system.

DETAILED DESCRIPTION

Figure 1A:
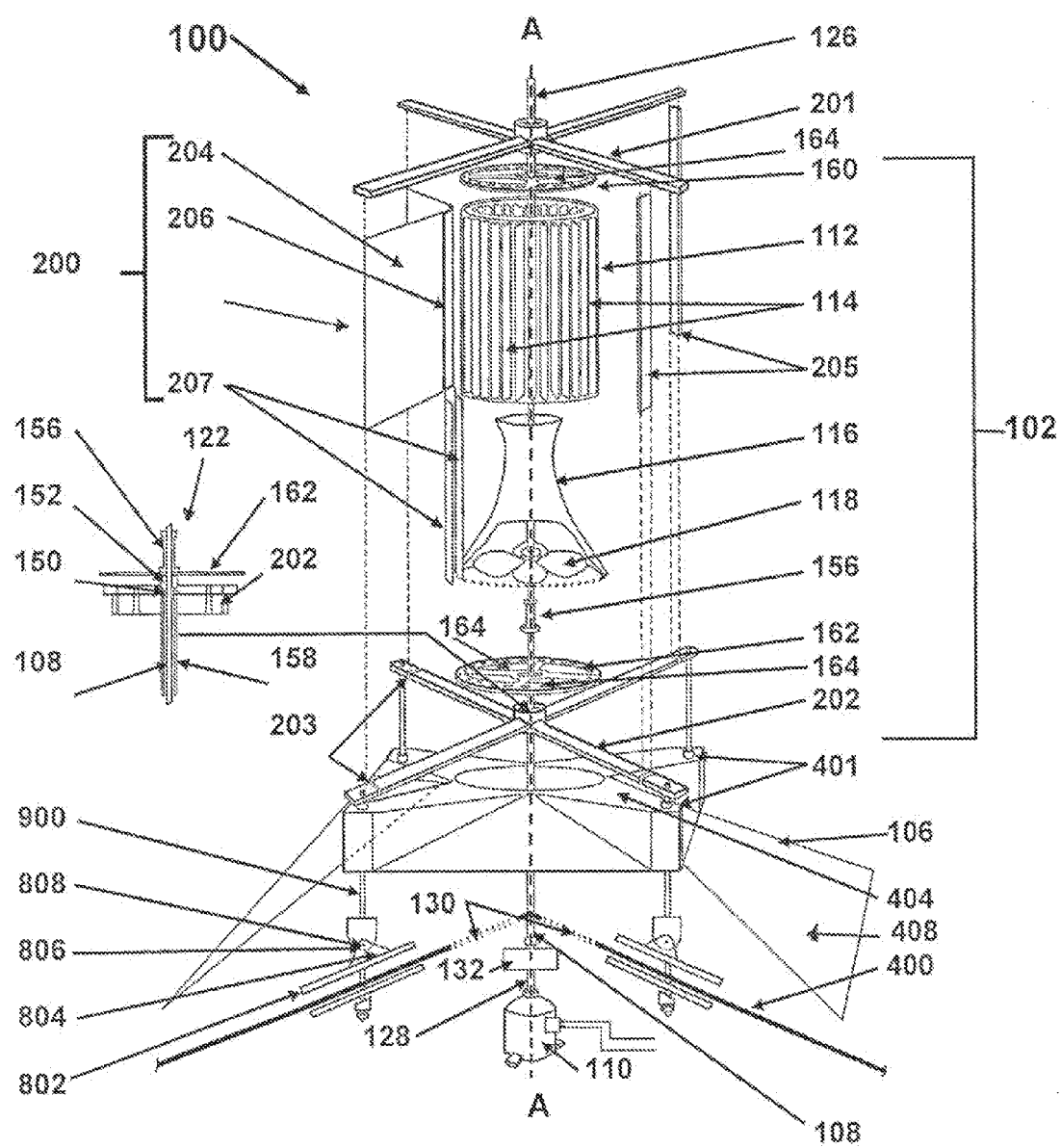
FIG. 1A shows a partial exploded view of various components of a first embodiment of an exemplary system to generate electricity using a flow of air according to the present novel technology.

For the purposes of promoting an understanding of the principles of the novel technology, reference will now be made to the embodiments illustrated in the drawings and specific language will be used to describe the same. It will nevertheless be understood that no limitation of the scope of the novel technology is thereby intended, such alterations and further modifications in the illustrated device, and such further applications of the principles of the novel technology as illustrated therein being contemplated as would normally occur to one skilled in the art to which the novel technology relates.

Figure 2A:
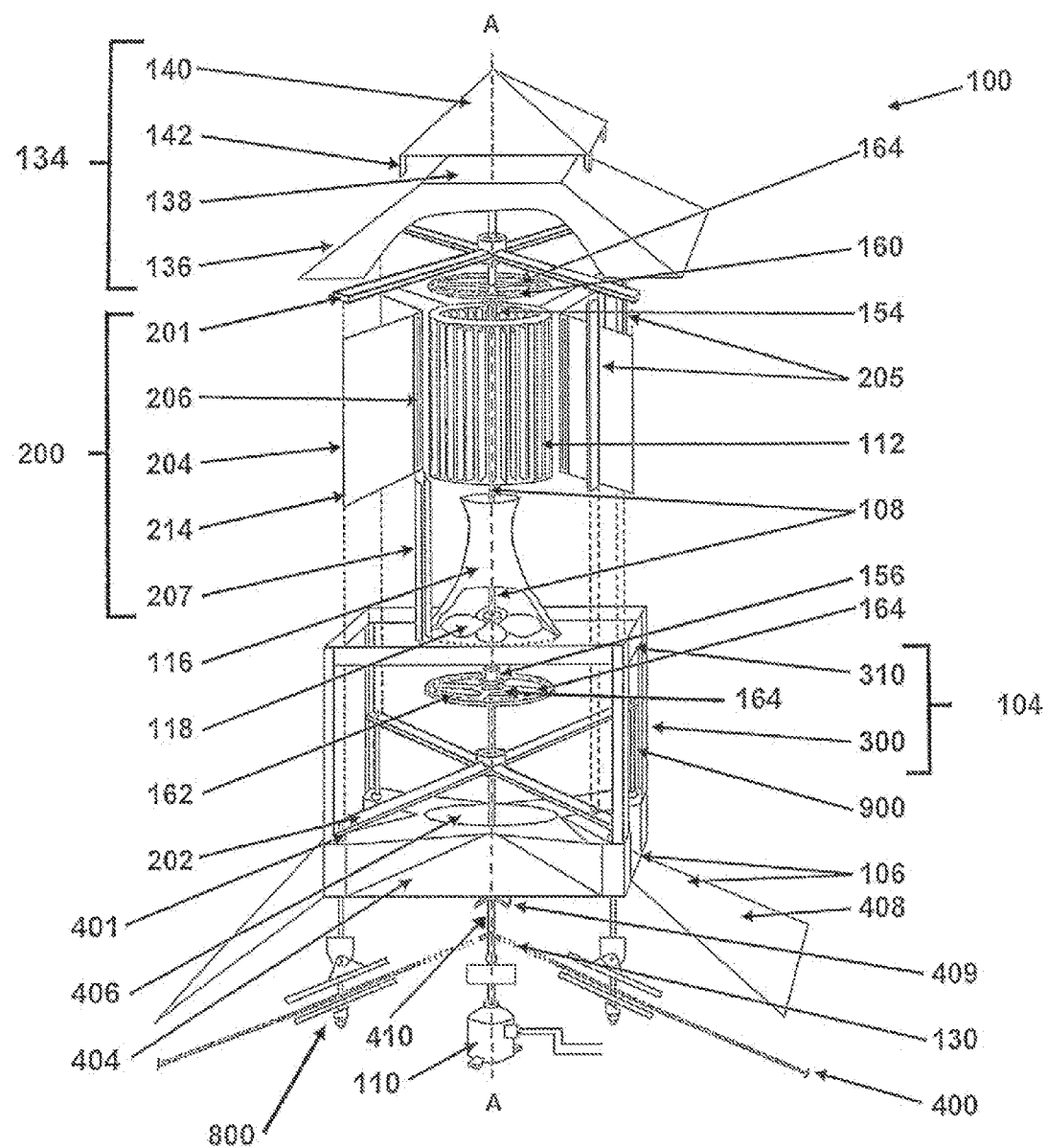
FIG. 2A shows a partial exploded view of various components of an embodiment of another exemplary system to generate electricity using a flow of air according to the present disclosure.

FIG. 1A shows an exploded view of various components of an exemplary system to generate electricity using a flow of air according to the present disclosure. As shown in FIG. 1A, system 100 comprises a turbine assembly 102, with various components of at least one embodiment of a system 100. FIG. 2A shows an exemplary embodiment of a system 100 of the present disclosure, comprising an exterior housing assembly 104, an integrated scoop assembly 106, a vertical shaft 108, and an alternator/generator 110, as described in further detail herein.

Figure 1C:
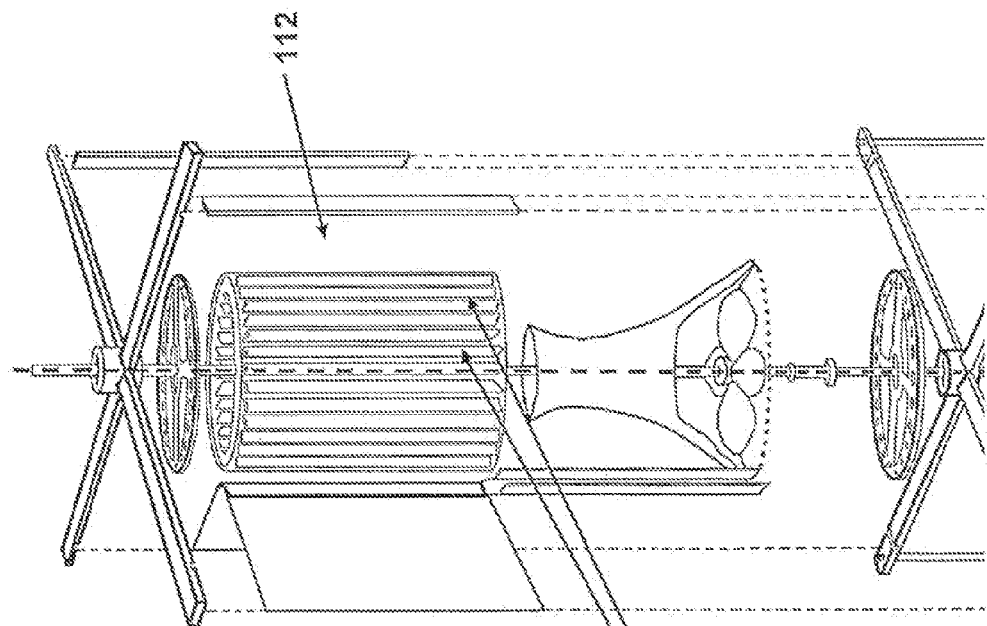
FIG. 1C shows a drawing of an exemplary configuration of an embodiment of a vertical blade as part of a cylindrical blade drum according to the present disclosure.
Figure 1B:
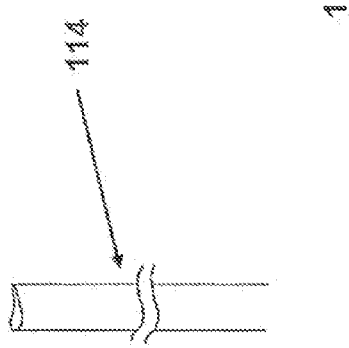
FIG. 1B shows a drawing of one example of an exemplary configuration of an embodiment of a vertical blade according to the present disclosure.

As shown in FIG. 1A, an exemplary turbine assembly 102 of system 100 comprises a cylindrical blade drum 112 comprising a plurality of vertical blades 114, wherein each vertical blade 114 is positioned at or near the external circumference of the cylindrical blade drum 112. Cylindrical blade drum 112, when in operation, would rotate about its vertical axis A-A shown in FIG. 1A. In at least one embodiment of a cylindrical blade drum 112 of the present disclosure, vertical blades 114 are equally spaced and aligned around the circumference of cylindrical blade drum 112. Vertical blades 114 facilitate rotation of cylindrical blade drum 112 due to air flow from any direction. In at least one embodiment of system 100, each vertical blade 114 is designed with an aerodynamic configuration for performance and responsiveness to the broadest range of wind (air flow) conditions using effective airfoil design and the angle of each vertical blade 114. Each vertical blade 114, as shown in FIGS. 1B and 1C, responds to the movement of air across its surface similar to the wings of an airplane, which themselves achieve lift by creating negative air pressure on the upper side of the airfoil. Similarly, the airfoil design of a turbine assembly 102 of the present disclosure moves in the direction of negative air pressure as air moves across the surface of the airfoil (namely the plurality of vertical blades 114), whereby vertical blades 114 are pushed by the wind to assist with rotation of cylindrical blade drum 112. FIGS. 1B and 1C show drawings of an exemplary configuration of a vertical blade 114 external to and as part of a cylindrical blade drum 112, respectively, whereby the airfoil design/configuration of such an exemplary vertical blade 114 is readily apparent.

An exemplary turbine assembly 102 of the present disclosure, and as shown in FIGS. 1A and 2A, further comprises a truncated cone 116 positioned within cylindrical blade drum 112, with cone 116 having a larger diameter at the bottom than at the top (e.g. a relatively small aperture at the top of the cone and a relatively large aperture at the bottom of the cone).

Figure 4B:
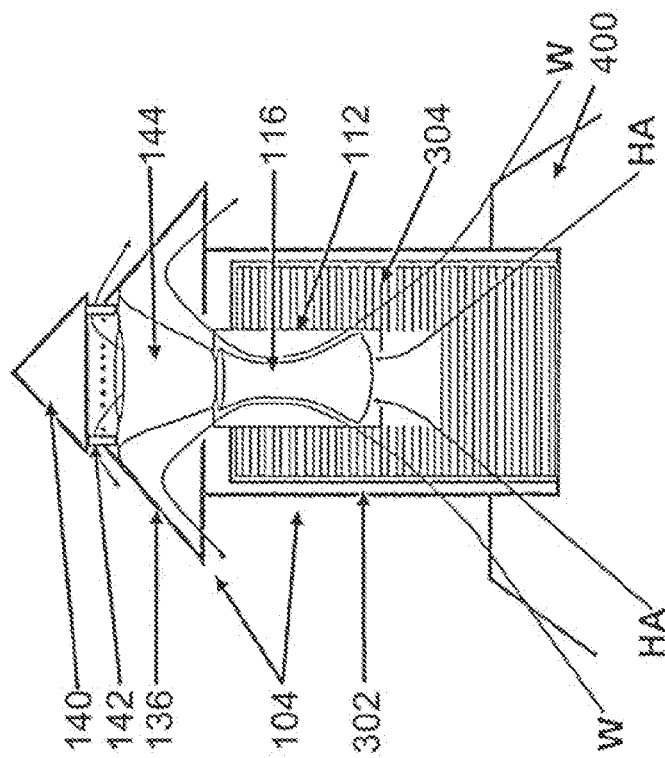
FIG. 4B shows a side view of at least a portion of an exemplary embodiment of a central cone assembly and a top pyramid cone assembly according to the present disclosure.

In at least one exemplary embodiment of the present disclosure, cone 116 has hyperbolic concave sides to expedite air flow through the interior of cone 116. In addition, an exemplary turbine assembly 102 comprises a fan blade 118 positioned within cone 116, whereby rotation of fan blade 118 is capable of using forced air from an attic (for example) in an upward vertical direction through the inside of cone 116. Cone 116, in at least one embodiment, operates in at least three different ways, namely to (i) deflect wind passing through vertical blades 114 up and out of cylindrical blade drum 112 on the outside of cone 116 as shown in FIG. 4B, (ii) act as a barrier to hot air rising from an attic or other upper portion of a building where relatively hot air accumulates, segregating air from the outside to reduce the likelihood of energy loss of system 100 through turbulence or back pressure, and (iii) direct the hot air exiting fan blade 118 from the attic up and out of the top of cone 116 through the center of cone 116.

Fan blade 118, in at least one embodiment, is a conventional wide prop fan blade aligned on vertical shaft 108 that may operate in at least two ways. First, fan blade 118 may operate passively due to rising hot attic exhaust air, whereby such hot air causes fan blade 118 to rotate, whereby rotation of fan blade 118 expedites the flow of hot attic exhaust air through the center of cylindrical blade drum 112 to supply additional power to the rotation of the cylindrical blade drum 112 to generate electricity as described in further detail herein. Second, fan blade 118 may operate due to the flow of air external to system 100 (outside air) through system 100, whereby such air causes fan blade 118 to rotate to further increase the relative rotation of cylindrical blade drum 112. Such operation of fan blade 118 to allow for the exit of hot air from a home attic, for example, operates as a ventilation system or hot air exhaust system. As discussed in further detail herein, on days with little or no outside wind to facilitate rotation of cylindrical blade drum 112, additional power coming from a heated attic and hot attic air may be available to rotate cylindrical blade drum 112.

In at least one additional embodiment, fan blade 118 may be powered by an external power source (not shown), whereby operation of such a power source may actively cause fan blade 118 to rotate to assist the rotation of cylindrical blade drum 112 as referenced herein. Turbine assembly 102, in at least one embodiment, may be held together using a top hub assembly 120 and a bottom hub assembly 122 as shown in FIGS. 1A, 1D, 1E, and 2A.

In at least one embodiment of system 100, cylindrical blade drum 112 revolves around a central axis (shown as A-A in FIG. 1A) with top hub assembly 120 and bottom hub assembly 122 functioning similar to spokes on a wheel, namely to permit cylindrical blade drum 112 to rotate about, attach to, an in at least one embodiment, substantially to completely steady, turbine assembly 102 on vertical axis A-A.

In at least one embodiment of a system to generate electricity using a flow of air of the present disclosure, such a system 100 comprise an exterior housing assembly 104 positioned around turbine assembly 102 as shown in FIG. 2A.

In an exemplary embodiment, an exterior housing assembly 104, as shown in FIG. 2A, includes a top cross-member 201, a bottom cross-member 202 and a plurality of wind funnels 204, with each funnel 204 having a funnel side wall 210 defining a vertical slit 206 therein. Funnel side walls 210, in various embodiments, may have straight or flat sides, hyperbolic sides, or convex sides. As shown in FIGS. 2D and 2E, wind funnels 204 may further include funnel top walls 211 coupled to the funnel side walls 210. Wind funnels 204, in at least one embodiment, are attached to vertical tie bars 205 which may be positioned between and mount to top cross-member 201 and bottom cross member 202.

Figure 3:
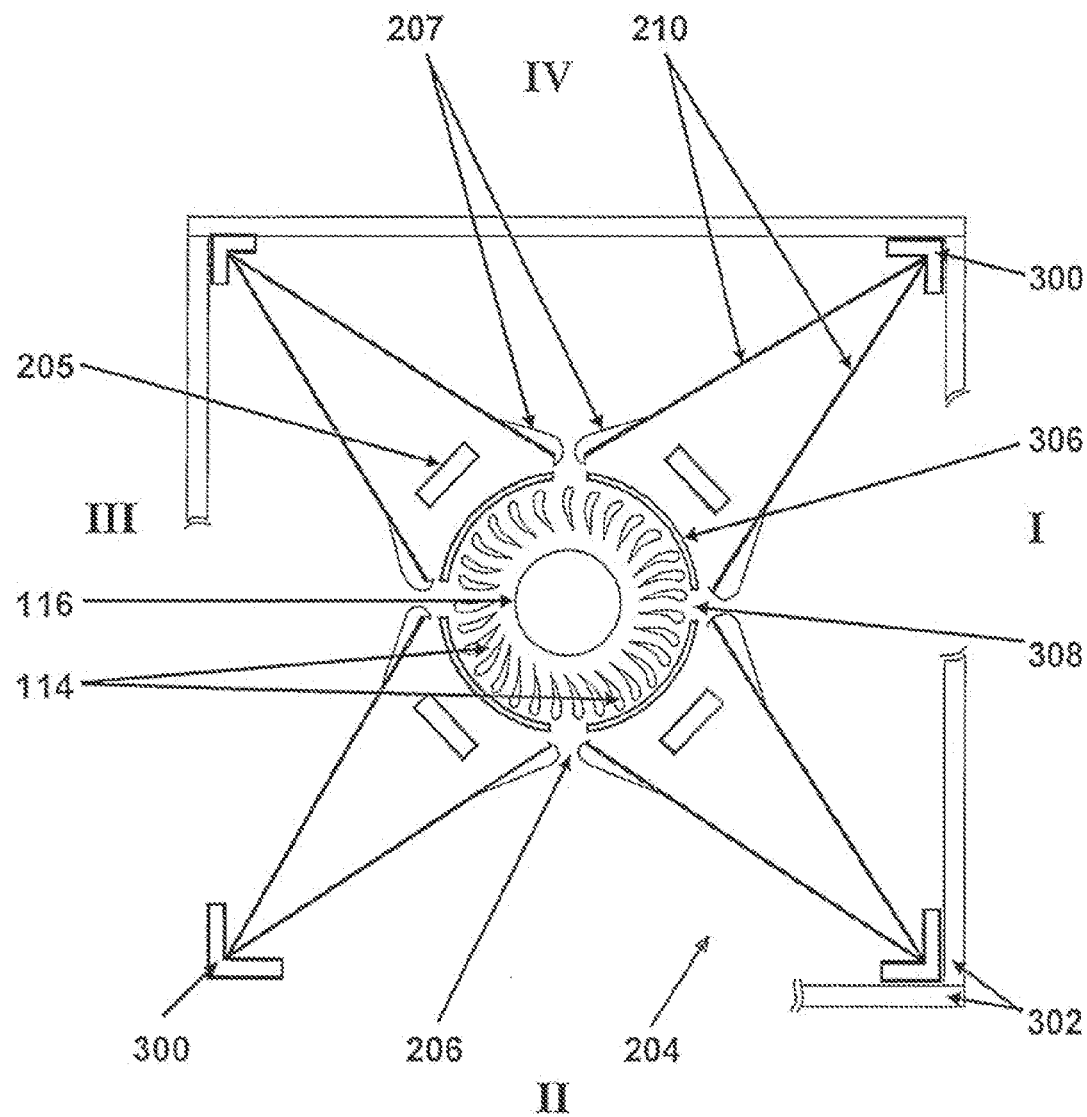
FIG. 3 shows a cross-sectional view of at least a portion of an embodiment of a system to generate electricity using a flow of air as it relates to an embodiment of an exterior housing assembly according to the present disclosure.

One an exemplary embodiment includes four wind funnels 204, each of which surround cylindrical blade drum 112, whereby each of the four wind funnels 204 occupies 90 degrees of a 360 degree perimeter. Each 90 degree quadrant includes one wind funnel assembly 200, which may include the various components as shown in FIG. 2A, that would focus the wind to the vertical blades 114 of cylindrical blade drum 112. For example, and as shown in FIG. 3, quadrant I would occupy approximately 0 degrees to 90 degrees, quadrant II would occupy approximately 91 degrees to 180 degrees, quadrant III would occupy approximately 181 degrees to 270 degrees, and quadrant IV would occupy approximately 271 degrees to 360 degrees.

In at least one embodiment, the four wind funnel assemblies 200 are fixed in position, and the combined effect of the configuration is to capture the wind from 360 degrees. Each vertical slit 206 in each wind funnel 204, in at least one embodiment, holds a nozzle 207, such as a venturi nozzle, which accelerates the air passing through the vertical slit 206/venturi nozzle 207 directed toward the cylindrical blade drum 112.

In an exemplary embodiment comprising a venturi nozzle 207, it is the combination of the wind funnel 204, the vertical slit 206 and the vertical venturi nozzle 207 assembly that focuses and accelerates the wind toward one vertical blade 114 at a time as it passes through the cylindrical blade drum assembly 112.

Figure 2B:
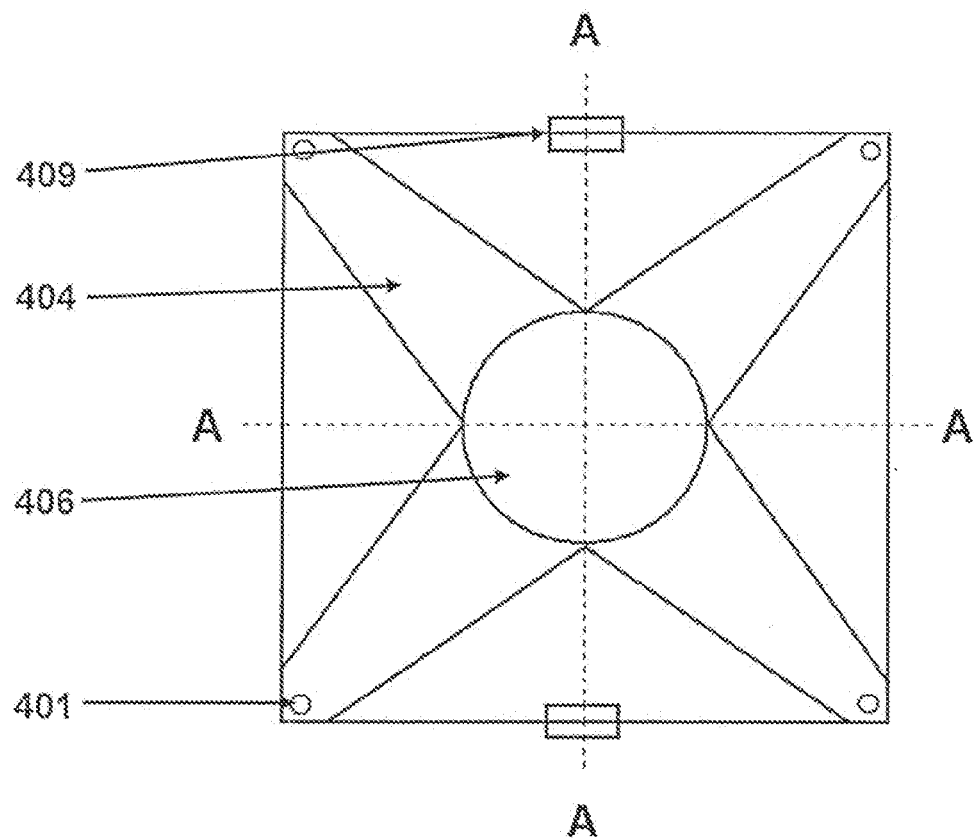
FIG. 2B shows a top-down view of at least a portion of various components of an embodiment of the central platform assembly according to the present disclosure.
Figure 2C:
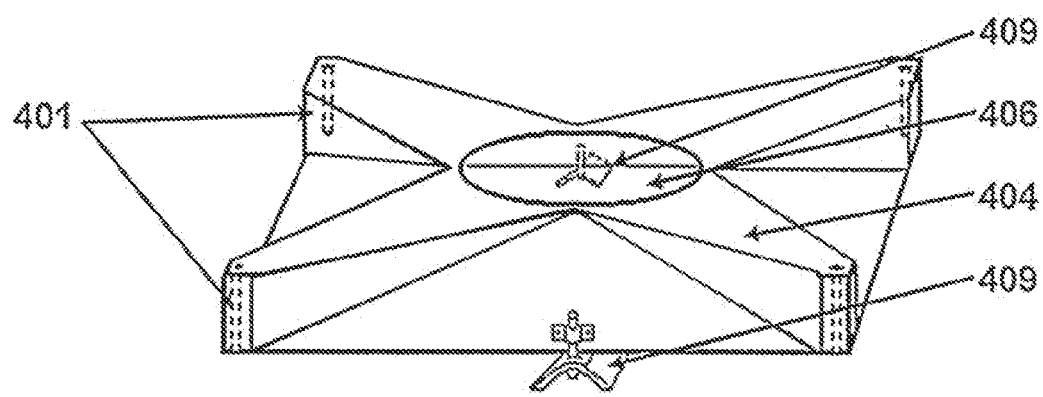
FIG. 2C shows a front view of at least a portion of various components of an embodiment of the central platform assembly according to the present disclosure.
Figure 2D:
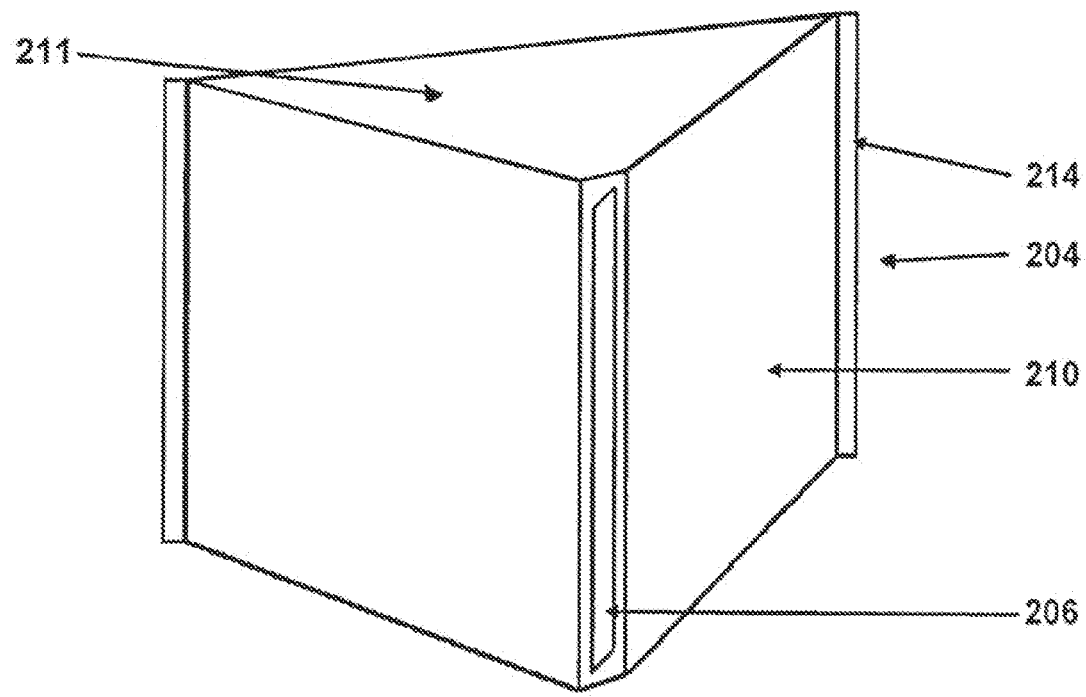
FIG. 2D shows a front view of at least a portion of an embodiment of a wind funnel with vertical slit and flanges according to the present disclosure.
Figure 2E:
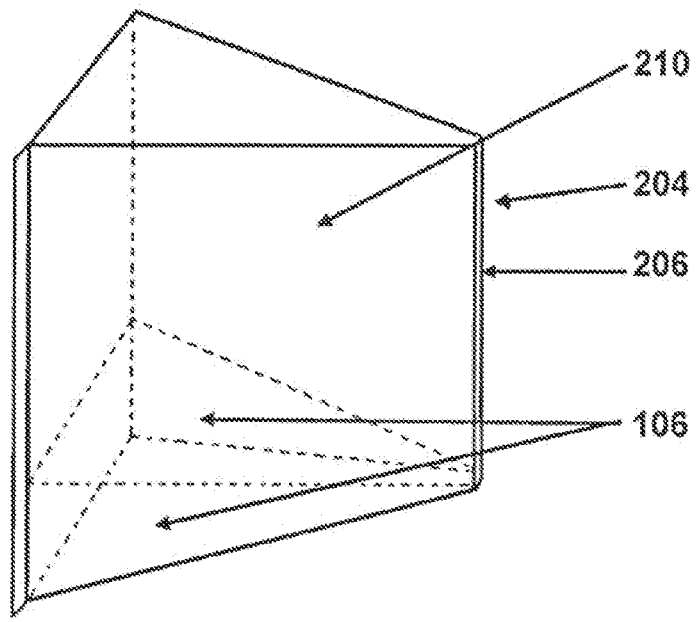
FIG. 2E shows a side view of at least a portion of an embodiment of a wind funnel assembly according to the present disclosure.

In one exemplary embodiment, and as shown in the top-down and front views of a portion of the housing and support system as shown in FIGS. 2B and 2C, the central platform base 404 may comprise a generally solid rigid base in conjunction with top cross-member 200, bottom cross-member 202, and a plurality of vertical tie bars 205, support wind turbine assembly 102. Further, central platform 404 acts to mount the system within an exterior housing 104 and to a building structure 400, such as to the roof of said structure 400.

In one exemplary embodiment, and as shown in the cross-sectional view of a portion of system 100 shown in FIG. 3, each funnel 204 may include a generally funnel shape (referred to as a "wind funnel"), whereby such a funnel 204 can comprise funnel side walls 210 that are relatively straight or flat, hyperbolic, or convex, in a design that scoops outward slightly to expedite airflow over the surface of the wind funnel (as discussed below).

In at least one embodiment, wind funnel 204 has hyperbolic sides, as such a configuration may be optimal depending on the overall size and/or positioning of system 100. The wind funnel 204 directs air toward the vertical slit 206 and nozzle 207 (as discussed below). At least one embodiment of wind funnel 204 may comprise flat or straight sides, whereby wind funnel 204 would be similar in shape to a pyramid lying on its side with an open base to the outside and the apex toward the cylindrical blade drum 112.

As referenced above, at the apex of each funnel 204 is a vertical slit 206 corresponding to the vertical blades 114 in the cylindrical blade drum 112. Each funnel 204 is positioned external to the turbine assembly 102 whereby the apex of wind funnel 204 faces turbine assembly 102. Vertical slits 206, as shown in FIG. 2D, in at least one embodiment, are in the shape of a parallelogram with parallel vertical sides.

In an exemplary embodiment, the height of the sides of each vertical slit 206 corresponds to the height of vertical blades 114, and the width of vertical slit 206 is no wider than the width of one to two vertical blades 114 side by side. In such an embodiment, the ends of the vertical slits 206 (top and bottom) do not form a right angle corner but instead form a non-rectangular parallelogram to allow for the free dispersal of vortex air currents. Vertical slits 206 in wind funnels 204 correspond and align to focus wind energy that passes through vertical slits 206 on to no more than two vertical blades 114 at a time. In addition to the foregoing, and in at least one embodiment of a system 100 of the present disclosure, at least one wind funnel 204 of an exemplary system is provided with a vertical slit 206 that corresponds to, and is fitted with, a venturi nozzle 207 as shown in FIGS. 1A, 1C, 2A, and 3.

In at least one embodiment, and as shown in FIG. 3, each vertical slit 206 of each funnel 204 is identical in shape and size and focuses a larger wind area to a smaller area with higher pressure entering vertical slits 206 leading to nozzles 207 and vertical blades 114. Nozzles 207, in at least one embodiment, focus and funnel the wind coming through vertical slits 206 in wind funnels 204. Furthermore, and in at least one exemplary embodiment, nozzles 207 may comprise venturi nozzles 207.

Nozzles 207, in various embodiments, can be molded or stamped into the wind funnels 204 without the need for a separate nozzle 207 part. Additionally, in at least one embodiment, the relative widths of vertical slits 206 may be adjusted/sized depending on the particular system 100 configuration. Should a wider vertical slit 206 configuration be necessary, multiple nozzles 207 may be used per wind funnel 204. In situations where vortexes or eddies associated with back pressure in wind funnels 204 due to the aperture/vertical slit 206 being too narrow, wider apertures 206 may be used.

As referenced above, and in an exemplary embodiment of an exterior housing assembly 104 of the present disclosure, exterior housing assembly 104 comprises a top cross-member 201 and a bottom cross-member 202 and a plurality of wind funnel assemblies 204 as shown in FIGS. 1A and 2A. Assembly 104 may further comprise a support and mounting system for turbine assembly 102, a plurality of vertical tie bars 205 and corner vertical housing supports 300 as shown in FIGS. 2A and 3. The bottom cross-member 202, positioned below fan blade 118 of the turbine assembly 102, is used as a platform for the turbine assembly 102 and as a mounting support to central platform 404 as shown in FIG. 2A.

Figure 5A:
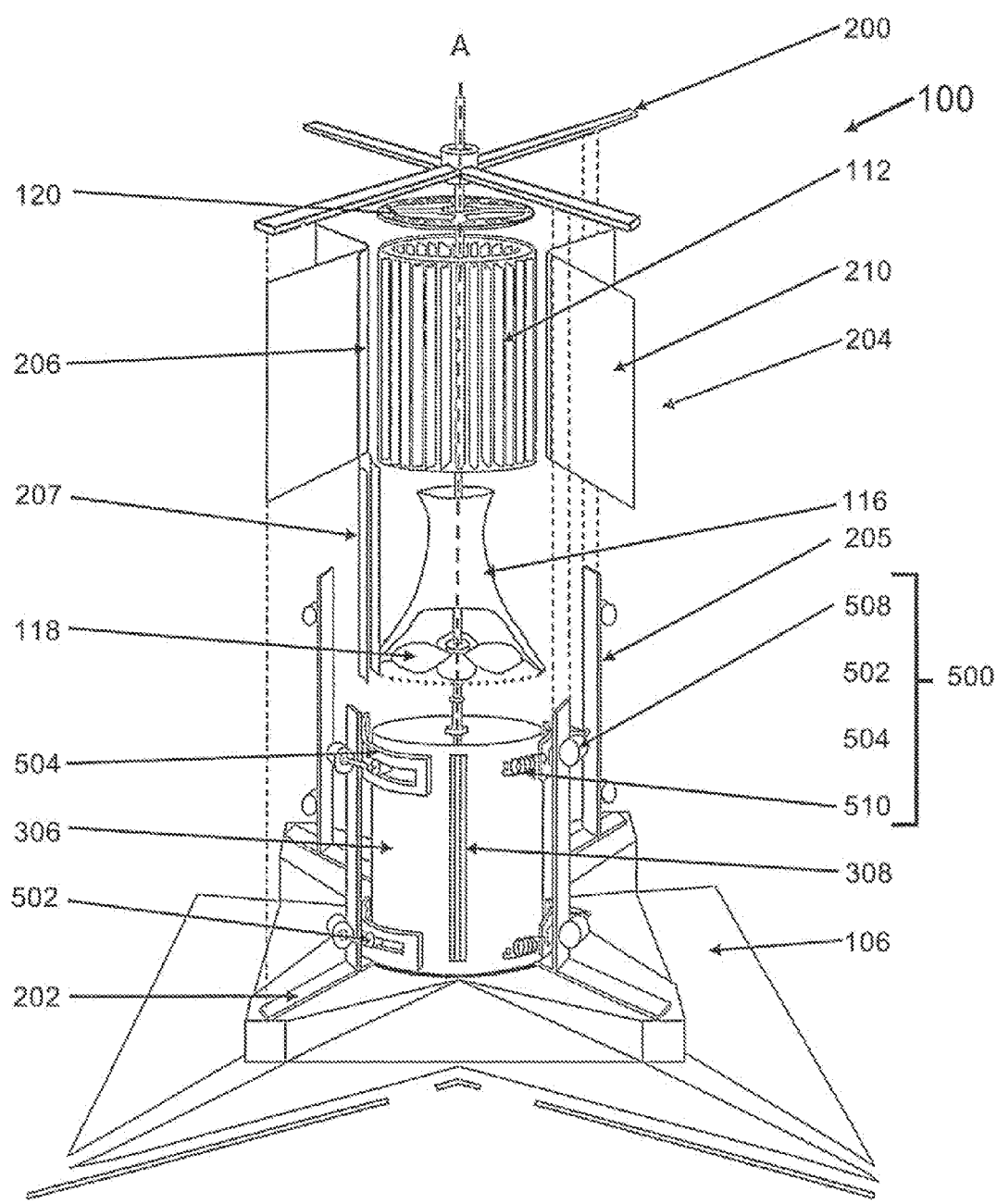
FIGS. 5A and 5B show exploded views of various components of embodiments of wind brake assemblies as partial exemplary systems to generate electricity using a flow of air according to the present disclosure.
Figure 6:
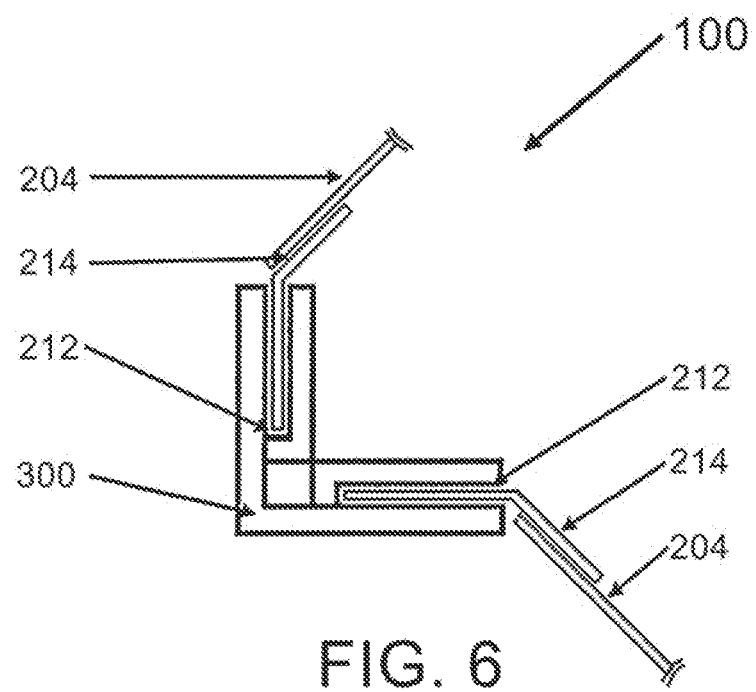
FIG. 6 shows a partial cross-sectional view of a portion of an embodiment of a corner vertical housing support assembly and wind funnel flanges according to the present disclosure.

In at least one exemplary embodiment the bottom cross-member 202 also ties and aligns turbine assembly 102 to a plurality of vertical supports 300 external to wind funnels 204 as shown in FIGS. 2A and 3. Vertical supports 300, in at least one embodiment, are coupled to the top cross-member 201 and the bottom cross-member 202 to provide attachment of or to exterior housing assembly 104 with joining flanges 214 as shown in FIG. 6. In at least one exemplary embodiment, vertical tie bars 205 maintain spacing, and tie the assembly together with top cross-member 201 and bottom cross-member 202 as shown in FIG. 5A. When constructing portions of system 100, and after wind funnels 204 are positioned about vertical tie bars 205, the top cross-member 201 may be installed to lock all or substantially all of the components in place. In one embodiment, the top cross-member 201 and bottom cross-member 202 may also tie the turbine assembly 102 into the outer corners 300 of the exterior housing assembly 104 (also referred to herein as a "cupola").

In at least one embodiment, four vertical tie bars 205, a top cross-member 201, and a bottom cross-member 202 may operate together to prevent turbine assembly 102 from being compressed, such compression hampering proper operation of system 100. In an exemplary embodiment of system 100, vertical tie bars 205 may fit within grooves 203 defined within top cross-member 201 and bottom cross-member 202.

In at least one embodiment of a system to generate electricity using a flow of air of the present disclosure, system 100 is mounted to a roof using bottom cross-member 202 as a base, top cross-member 201 tied together with vertical tie bars 205 to form a ridged box around turbine assembly 102. Bottom cross-member 202, in at least one embodiment, is mounted onto rigid base 404 using threaded rod assembly 900 through base mounting holes 401 to the roof decking using foot plate mounting assembly 800 as shown in FIGS. 2A, 2B, 2C, 8A, 8B, 9A, and 9B.

In at least one embodiment of a system to generate electricity using a flow of air of the present disclosure, such a system 100 is mounted within an exterior housing assembly 104. The exterior housing assembly 104 provides protection from the weather for system 100 and isolates the blades from the outside for safety to birds, animals and people, for example.

Figure 14:
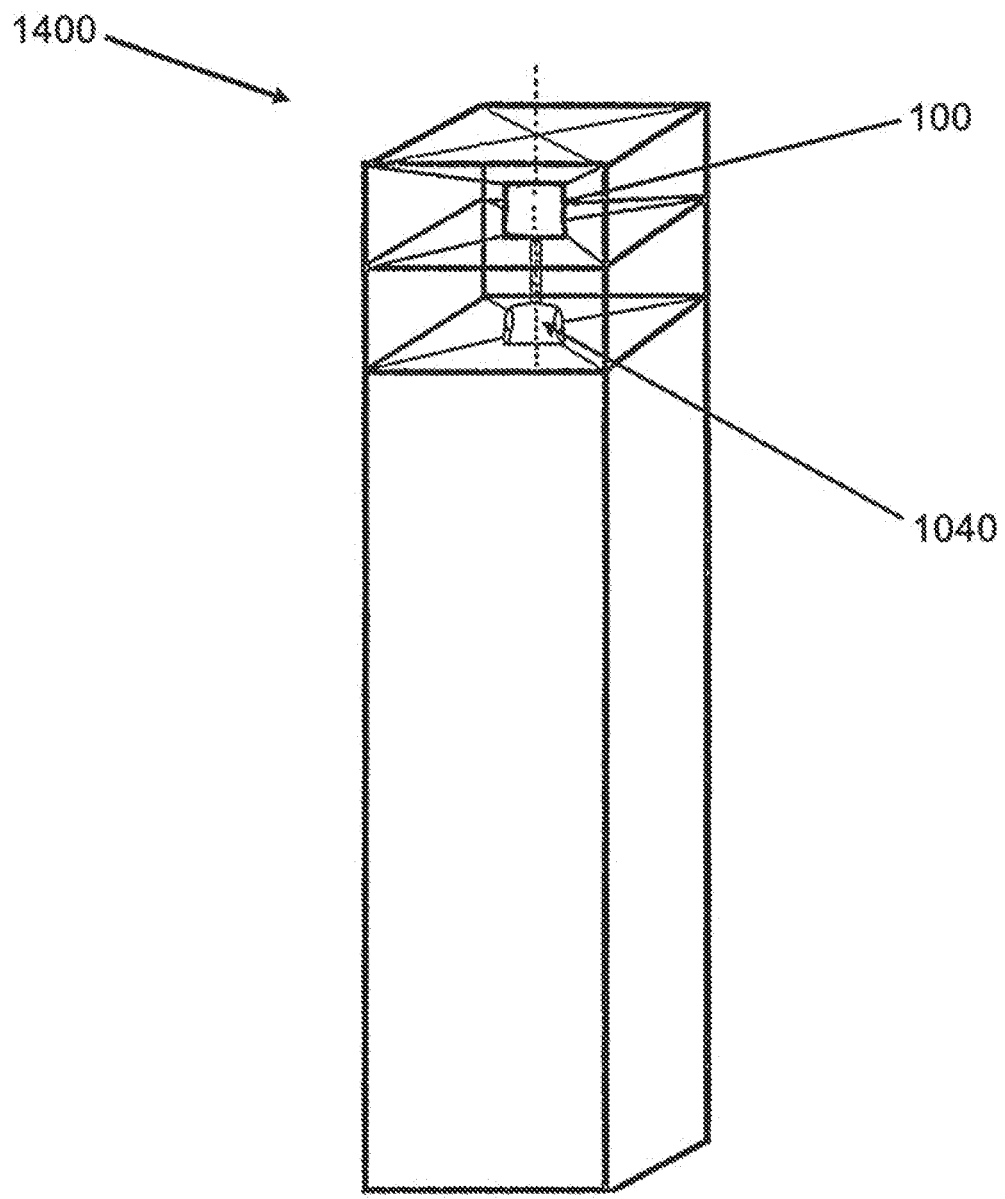
FIG. 14 shows a perspective view of an embodiment of an exemplary application of the wind power system applied to a high rise or skyscraper.
Figure 15:
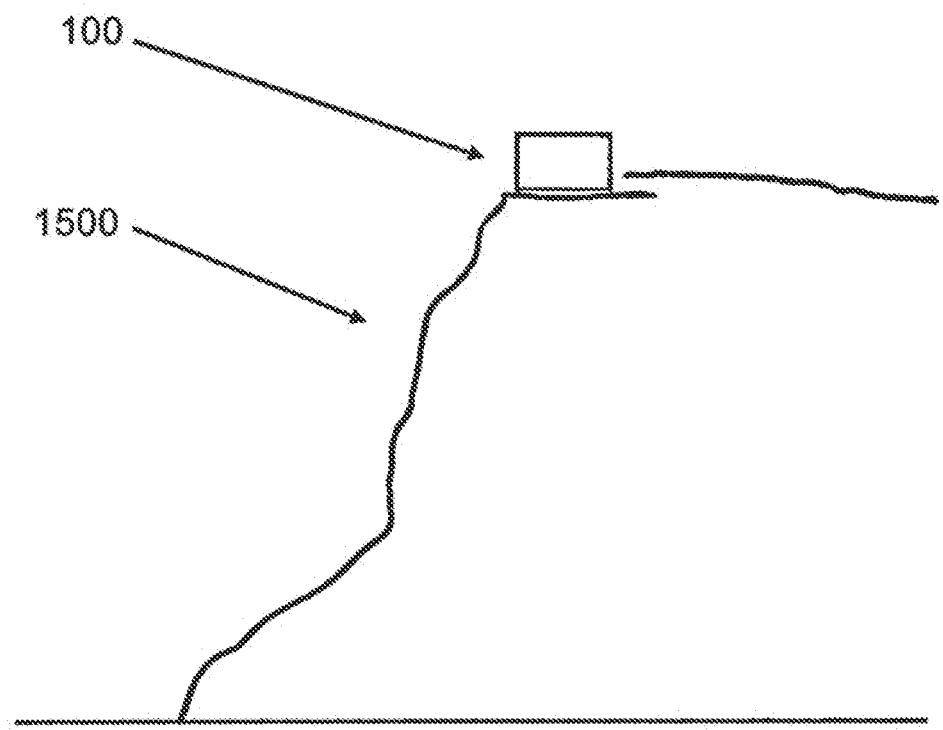
FIG. 15 shows a perspective view of an embodiment of an exemplary application of the wind power system applied to an exampled of a scaled application to a hill side or mountain top.

The exterior housing 104 can take numerous configurations, for example that of a cupola when used on top of a roof. System 100 and/or components of system 100 (such as electric generator system 1040, comprising at least alternator/generator 110 and optionally clutch 132) can also occupy one or more floors of a high rise building 1400 as shown in FIG. 14 or could be set on a hillside or mountaintop 1500 where the enclosure could imitate its surroundings as shown in FIG. 15.

Figure 1D:
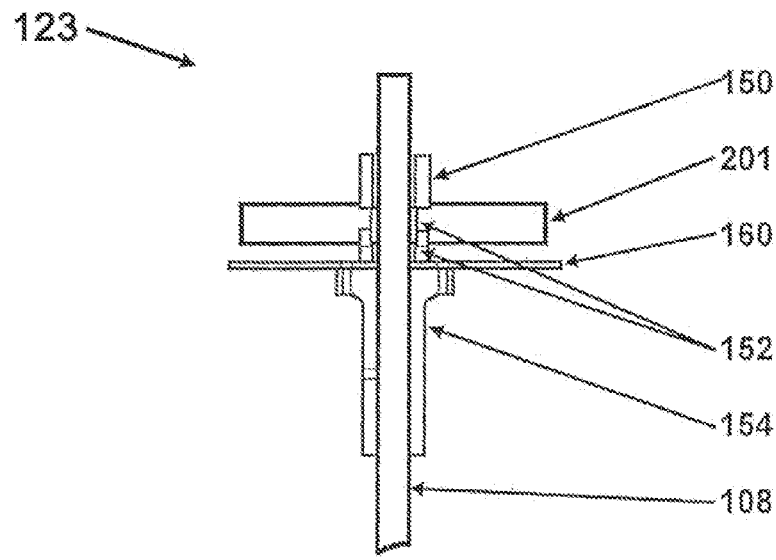
FIG. 1D shows a drawing of an exemplary configuration of an embodiment of a top hub assembly as part of a vertical blade assembly according to the present disclosure.
Figure 1E:
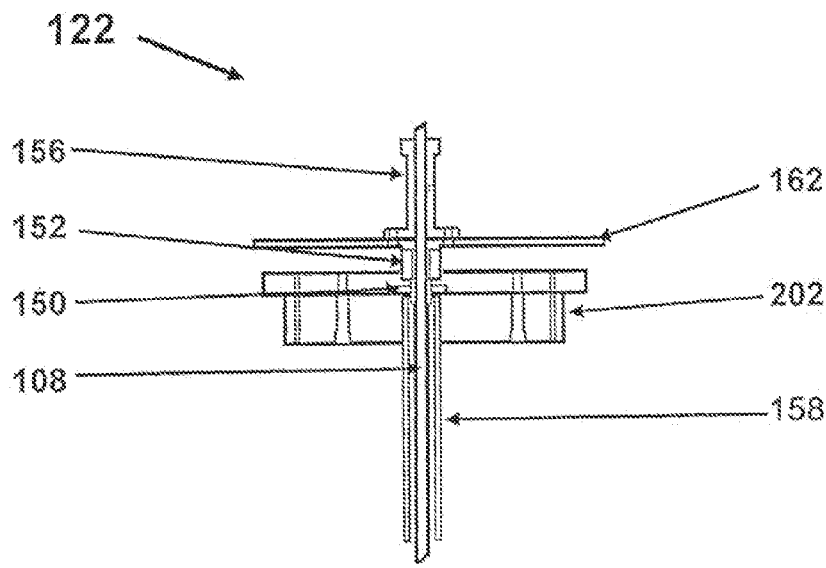
FIG. 1E shows a drawing of an exemplary configuration of an embodiment of a bottom hub assembly as part of a vertical blade assembly according to the present disclosure.

In an exemplary embodiment of exterior housing assembly 104, and as shown in FIG. 2A, exterior housing assembly 104 comprises a top cross-member 201, a bottom cross-member 202 and a plurality of wind funnels 204, with each funnel 204 having a flat or convex portion and defining a vertical slit 206 therein. In addition to the foregoing, top cross-member 201 and bottom cross-member 202, in at least one embodiment of a system 100 of the present disclosure, are further operable to house the top hub assembly 120 and the bottom hub assembly 122, respectively, as shown in FIGS. 1A, 1D, and 1E.

In at least one embodiment of a system 100 of the present disclosure, top cross-member 201 ties and aligns the turbine assembly 102 to the vertical shaft 108. The turbine assembly 102 is joined to the exterior housing assembly 104 by attaching vertical supports 300 to the top cross-member 201, bottom cross-member 202 and central platform 404 as shown in FIG. 2A.

As shown in FIG. 2A, bottom cross-member 202 may be positioned above rigid base 401 to further assist with aligning bottom cross-member 202 within system 100. When in place, bottom cross-member 202 may further align exterior housing assembly 104 when this configuration is used. Furthermore, rigid base 404 may act as a base for installation of the components of turbine assembly 102.

In one exemplary embodiment, when used with exterior housing 104 the components of turbine assembly 102 (namely bottom hub assembly 122), fan blade 118, cone 116, cylindrical blade drum 112, and top hub assembly 120, may each be slid over vertical shaft 108, in order. Wind funnels 204, in at least one embodiment, align and attach to vertical tie bars 205, thereby adding overall strength and further aligning the components of system 100.

Bottom hub connector assembly 156, as shown in FIGS. 1A and 1D, may permit substantially or completely frictionless rotation of cylindrical blade drum 112 by way of various bushings, bearings, and/or magnet components coupled to one or more portions of system 100 via vertical shaft 108. In at least one embodiment, bottom cross-member 202, with bottom hub connector assembly 156 as shown in FIGS. 1A and 1D, may comprise at least one earth magnet 208 to replace bearings 152, whereby earth magnets 208 permit the frictionless rotation of cylindrical blade drum 112. In such an embodiment, a relatively minor air flow, either horizontally external to system 100 or vertically from within, for example, a hot attic, would allow cylindrical blade drum 112 to freely rotate.

In various other examples, one or more bushings 150 and/or bearings 152, as shown in FIGS. 1A, 1D, and 1E, may be used to physically couple various portions of turbine assembly 102 together and still permit rotation of cylindrical blade drum 112. Cylindrical blade drum 112, in at least one example, may use industrial-grade bearings 150 and bushings 152 at the top and bottom of cylindrical blade drum 112 to afford the least torque resistance and maximum durability when using such a physical coupling.

Components of an exemplary top hub assembly 120 of the present disclosure are shown in FIG. 1D. As shown in FIG. 1D, an exemplary top hub assembly 120 comprises a top cross-member 201, a top hub plate 160, and a top hub connector 154, whereby each of said components is coupled together to form said top hub assembly 120 by way of vertical shaft 108. In addition, and as shown in FIG. 1D, top hub assembly may optionally comprise one or more bushings 150 and/or bearings 152 positioned at various locations about top hub assembly 120 to facilitate easy movement of said components. Similarly, an exemplary bottom hub assembly 122 of the present disclosure is shown in FIG. 1E. As shown in FIG. 1E, an exemplary bottom hub assembly 122 comprises a bottom hub connector 156, bottom hub plate 162, and a bottom cross-member 202 held in place using a vertical shaft 108. Various bushings 150 and/or bearings 152 may also be used as described herein. Furthermore, an optional tube 158 may be used around vertical shaft 108, providing structure to couple one or more components of bottom hub assembly 122 thereto.

Top hub plate 160 and bottom hub plate 162, as described above and as shown in FIGS. 1A and 2A, may define a series of plate apertures 164 therethrough, so that top hub plate 160 and bottom hub plate 162 can provide structural support to system 100 while not preventing air flow through said system 100.

Figure 4A:
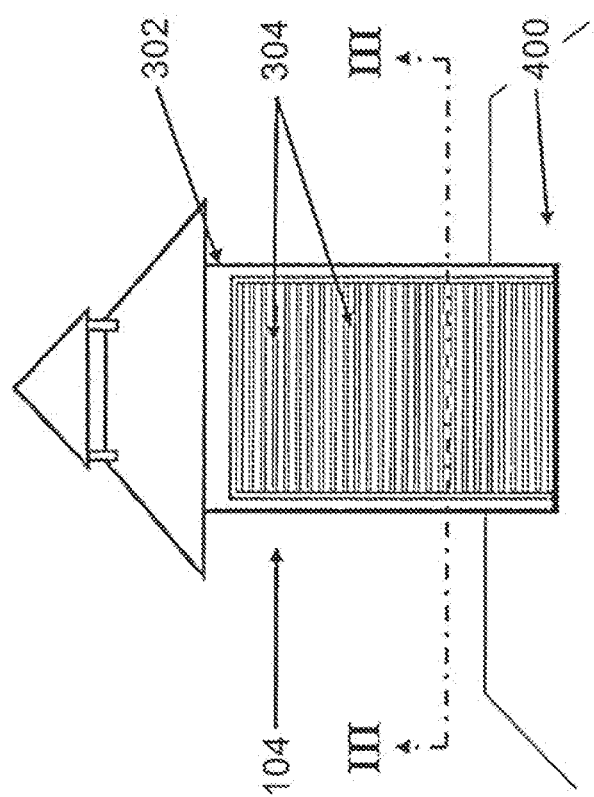
FIG. 4A shows a side view of at least a portion of an exemplary embodiment of an exterior housing assembly coupled to a building roof according to the present disclosure.

An exemplary exterior housing assembly 104 of the present disclosure as shown in FIG. 4A, along plane III-III may optionally further comprise a plurality of housing walls 302 external to the plurality of wind funnels 204. Housing walls 302, as shown in the side view of an exemplary system 100 positioned upon a building structure 400 shown in FIG. 4A, may comprise a housing grill 304 dimensioned to permit the flow of external air into system 100.

In at least one embodiment, apertures of housing grill 304 are defined using steel wire with such a configuration providing minimal restriction to outside air flow into system 100, but sufficient restriction to prevent birds, for example, from gaining access thereby avoiding injury. Wire grill 304 may have apertures having any number of shapes including, but not limited to, round, semi-circular, oval, square, rectangular, triangular, and/or an irregular shape.

As shown in FIG. 4B, and provided as at least one exemplary embodiment of external wind flow through system 100 of the present disclosure, external wind (shown as arrows "W") may flow into system 100 through wind grill 304 of exterior housing assembly 104 and through at least part of cylindrical blade drum 112, whereby the wind would be deflected by cone 116 to cause the wind to then flow upward and back out of system 100.

As shown in FIG. 4B, and provided as at least one exemplary representation of external wind flow through system 100 of the present disclosure, external wind (shown as arrows "W") would be deflected by top pyramid cone 144 to cause the wind to exit the lower pyramid 136. Additionally, hot air (shown as arrows "HA") exiting the attic through the inside of cone 116 would be directed through top pyramid cone 144 to exit pyramid 140 and separate from external wind flow.

Figure 4D:
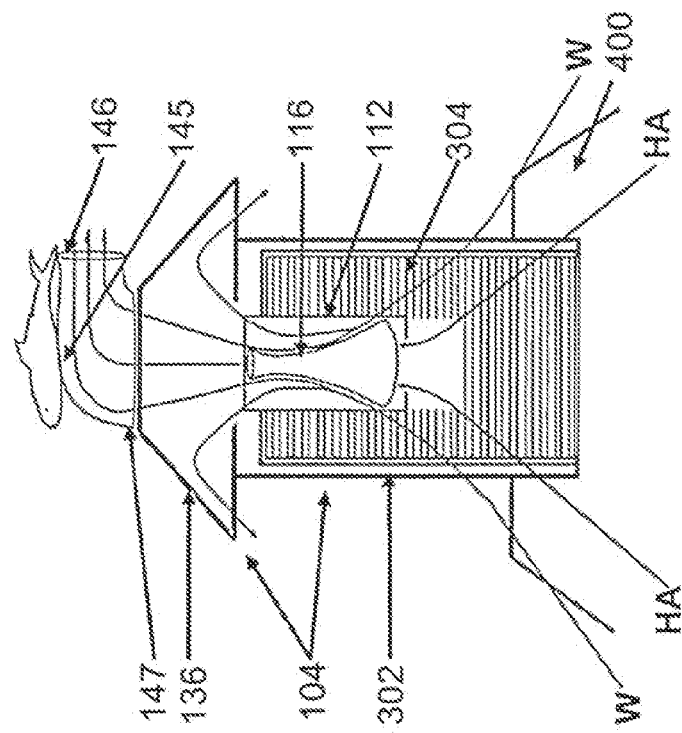
FIG. 4D shows a side view shows of at least a portion of an exemplary embodiment of a central cone assembly and a pyramid assembly coupled to a wind vane venting assembly according to the present disclosure.
Figure 4C:
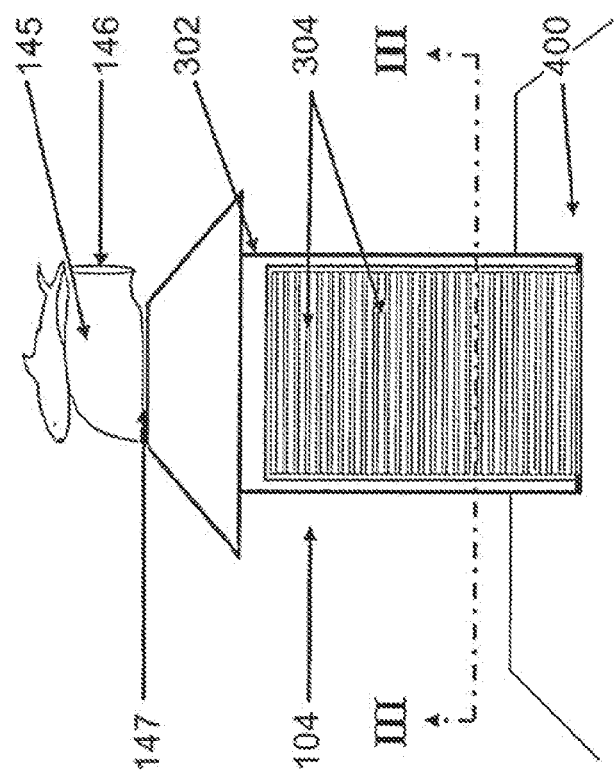
FIG. 4C shows a side view of at least a portion of an exemplary embodiment of an exterior housing assembly and wind vane venting assembly coupled to the pyramid assembly according to the present disclosure.

In at least one embodiment, and as shown in FIGS. 4C and 4D, exhaust air would exit through a wind vane and vent assembly instead of using one or more pyramids as described herein. For example, and as shown in FIGS. 4C and 4D, a wind vane/vent 145 could be positioned above lower pyramid 136, and external wind "W" and/or hot air "HA" would escape wind vane 145 through wind vane aperture 146. Such an embodiment would not only provide a pleasing aesthetic appearance, but also could be used to direct exhaust air away from oncoming wind and would create a vacuum that would expedite the exhaust of air. Wind vane 145, in at least one embodiment, could swivel/rotate a full 360° using swivel mechanism 147 coupled to wind vane 145, noting that the vacuum created by such an embodiment (if rotated to form a vacuum as described above) would be directly proportional to the wind velocity since the wind would simultaneously be blowing into the wind funnels 204 and past the exit of wind vane 145 thus creating proportional flow of air at input and exhaust. Such an embodiment may have the effect of reducing or eliminating the potential for air backing up in other embodiments. An exemplary exterior housing assembly 104 of the present disclosure could be affixed to a building structure 400, for example, by way of a foot plate mounting assembly 800 using a threaded rod assembly 900 as shown in one or more of FIGS. 1A, 2A, and 8B. Foot plate mounting assembly 800, as shown in FIGS. 1A, 2A, 8B in conjunction with rigid base 404 as shown in FIGS. 3, 8 is configured to position the exterior housing assembly 104 upon a building structure 400 based, in part, on the angle of the lower walls 408 as shown in FIG. 8B of the integrated scoop assembly 106.

Figure 8A:
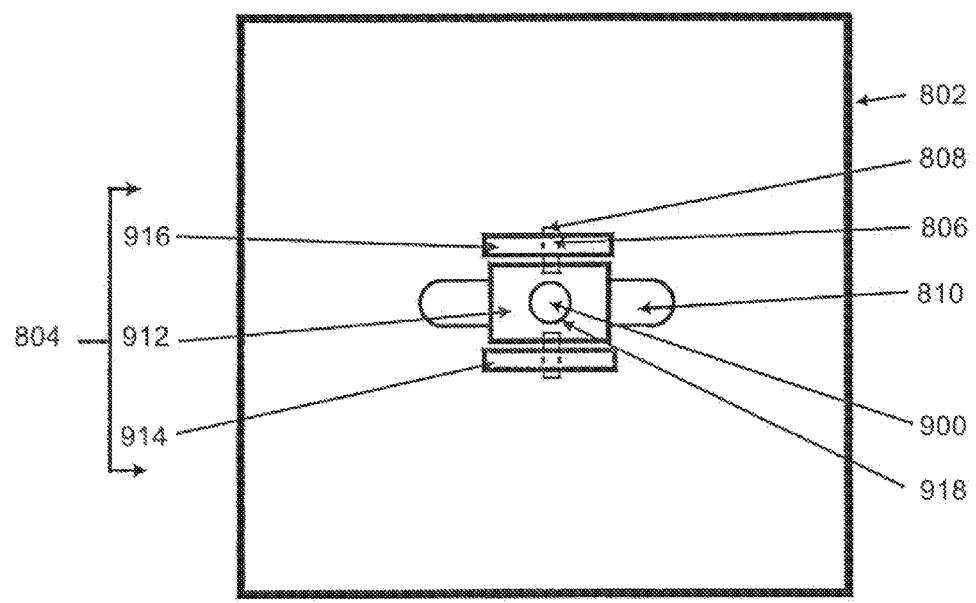
FIG. 8A shows top-down view of a portion of an embodiment of an exemplary foot plate mounting assembly according to the present disclosure.
Figure 8B:
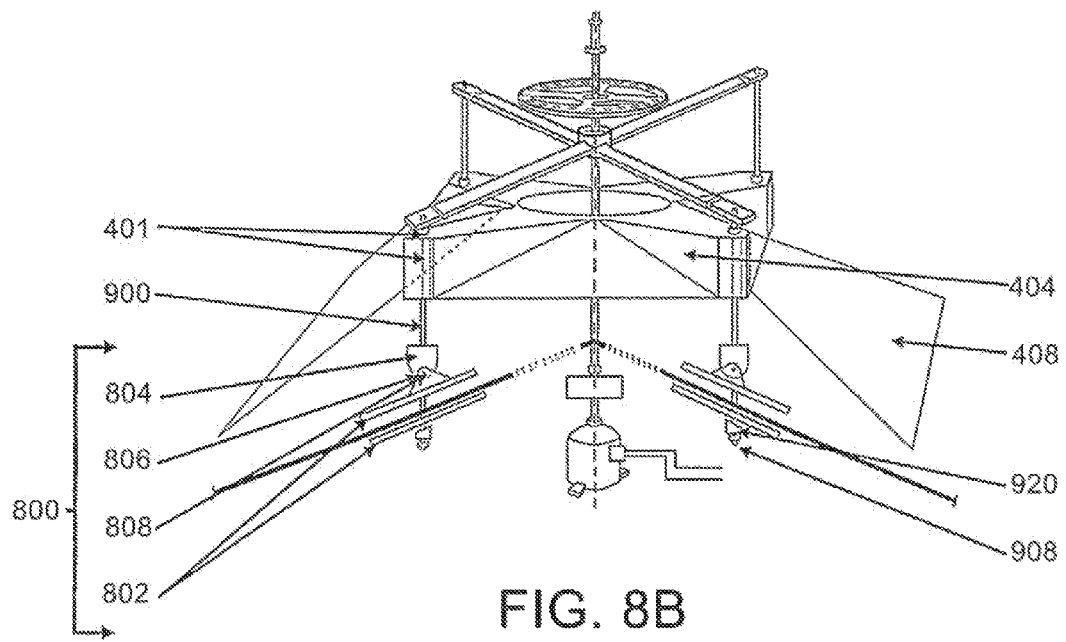
FIG. 8B shows a side view of an embodiment of a roof with a portion of the central platform and foot plate mounting assembly coupled thereto according to the present disclosure.

As shown in FIGS. 2A and 8B, and in at least one embodiment lower walls 408 of integrated scoop assembly 106 are configured at an angle to correspond to the angle of building structure 400, allowing integrated scoop assembly 106 to rest securely upon building structure 400. As shown in FIG. 2A, lower walls 408 of integrated scoop assembly 106 are configured at an angle to correspond to the angle of building structure 400, allowing integrated scoop assembly 106 to rest securely upon building structure 400 whereby most, if not all, of lower walls 408 of scoop assembly 106 contact building structure 400. A central platform 404, as shown in FIGS. 1A, 2A, and 8B may be substantially horizontal to correspond to the alignment of the bottom cross-member 202. Furthermore, an optional ridge collar 409, as shown in FIG. 2A, may be positioned between central platform 404 and building structure 400, whereby ridge collar 409 is configured to engage a building structure apex 410 (such as a roof peak) and provide support for central platform 404.

In at least one embodiment, central platform 404 and integrated scoop assembly 106 operate to funnel hot air rising from an attic trough slits cut in the roof decking (namely roof apertures 130 shown in FIGS. 1A and 2A) up and through central platform aperture 406 and through fan blade 118 and cone 116. Central platform 404 and integrated scoop assembly 106 may also act as an integral base for exterior housing assembly 104 and base for wind funnels 204. Such a design allows hot air to exit the attic through roof apertures 130 and a central platform aperture 406, channeled by central platform 404 and integrated scoop assembly 106 (as shown in FIGS. 1A and 2A), which directs the air through the fan blades 118 and through the center of cone 116 thereby gaining additional energy from the hot air in the attic. Central platform 404, in at least one embodiment, also increases the available area of wind by integrating into funnel 204 thereby expanding the volume of air being directed to vertical blades 114 of cylindrical blade drum 112.

When used for residential or small industrial designs, for example, various portions of a system 100 of the present disclosure may be enclosed within an exterior housing assembly 104, as shown in FIGS. 2A, 4A, and 4B, which integrates internal portions of system 100 into the overall design and architecture of the building. As discussed herein, such a system 100 may also operate as a hot air ventilation system for structural attics. Due to potential damage from the weather, an exemplary exterior housing assembly 104 may further operate to protect the inner components of system 100 from, for example, rain and snow. Such protection may be provided by, for example, gravity when rain or snow enters housing grill 304 of exterior housing assembly 104 (to allow the rain or snow to drain from exterior housing assembly 104), and may also be provided by the physical barrier protection of wind funnels 204 and/or a wind break drum 306 as shown in FIG. 3 and discussed below. Furthermore, exterior housing assembly 104 may attach to wind turbine assembly 102 of system 100, and may be aligned to the building structure 400, through central platform 404 assembly, as discussed in herein.

As shown in FIG. 1A, a vertical shaft 108 is used within system 100 to couple various components together and align said components to allow system 100 to operate. As shown in FIG. 1A, vertical shaft 108 comprises a first end 126 and a second end 128, whereby second end 128 of vertical shaft 108 is positioned within an alternator/generator 110 coupled to an interior portion of a building. Operation of system 100, by rotation of cylindrical blade drum 112 due to air flow from outside and/or inside of a building, causes vertical shaft 108 to rotate, with rotation of vertical shaft 108 causing alternator/generator 110 coupled thereto to operate and generate electricity. For example, rotation of vertical shaft 108 may cause alternator/generator 110 coupled to an electrical system (shown in FIG. 10) to operate and provide direct current (DC) electrical power (or alternating current (AC) electrical power, depending on the type of alternator/generator 110 used) for designated applications.

As shown in FIGS. 1A and 2A an exemplary system 100 may further comprise an optional clutch 132 operably coupled to vertical shaft 108, whereby clutch 132 is operable to engage rotation of vertical shaft 108.

In addition to the foregoing, any number of additional components including any number of forms of transmissions or coupling devices for use with turning vertical shaft 108 and/or assembling the various portions of an exemplary system 100 are also within the scope of the present application. For example, one or more bushings 150 or bearings 150, as shown in FIGS. 1A, 1D, and 1E may be used between one or more components of an assembled system 100. As shown in FIG. 1A, and in at least one embodiment of a system 100 of the present disclosure, a bushing 150 may be positioned around vertical shaft 108 between fan blade 118 and bottom hub assembly 122.

In at least one exemplary embodiment of a system 100 of the present disclosure, system 100 further comprises at least one wind break drum 306 as shown in FIGS. 3 and 5.

Wind break drum 306, in at least one embodiment, is a circular drum with four break apertures 308 corresponding to vertical slits 206 in wind funnel 204. Wind break drum 306 occupies the next concentric ring outbound from the center axis A-A after cylindrical blade drum 112, and in at least one embodiment, resides 0.25" from the outside diameter of cylindrical blade drum 112 and 0.25" inside the fixed nozzles 207 as shown in FIG. 3. Wind break drum 306, when used within an exemplary system 100 of the present disclosure, operates to protect vertical blades 114 from excessive wind speed.

In an exemplary embodiment, cylindrical blade drum 112 is surrounded by wind break drum 306 having four break apertures 308 corresponding to four nozzles 207 that funnel and direct the wind to vertical blades 114 of cylindrical blade drum 112. Wind break drum 306, in such an exemplary embodiment, operates by rotating away from a maximum opening to a minimum opening, for example, and in low wind conditions, the combination of vertical slits 206 and break apertures 308 are wide open to allow available wind to engage vertical blades 114. As the rotational speed of vertical shaft 108 increases due to wind speed increases beyond the optimum operating range (for example, 25 mph in at least one embodiment), a mechanism 500 (as shown in FIG. 5A) rotates wind break drum 306 and corresponding break apertures 308 so that outside wind is effectively prevented (substantially or completely) from entering vertical blades 114. In at least one embodiment, mechanism 500 may provide various degrees of closing wind break drum 306 to more precisely control the rotational speed of vertical shaft 108. A positioning device such as a solenoid or servo motor 508 engages to close the combination of vertical slits 206 and break apertures 308 in relation to each other. By rotating wind break drum 306 in such a manner, the amount of wind reaching vertical blades 114 is restricted. The amount the combination of vertical slits 206 and break apertures 308 are open is inversely proportional to the over-wind condition so that system 100 utilizes all available wind while simultaneously protecting the portions of system 100 from wind damage. Such an exemplary wind break drum 306 requires few moving parts and maintains maximum efficiency as it automatically adjusts to control the amount of wind reaching vertical blades 114 over the entire range of wind conditions.

Figure 1F:
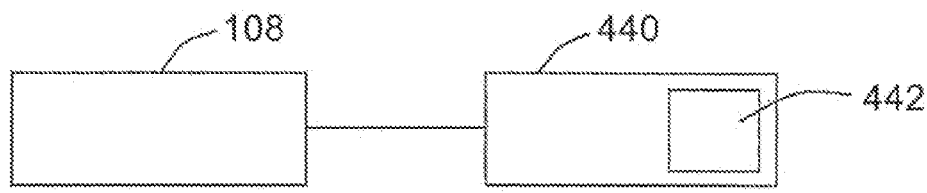
FIG. 1F shows a block diagram of various components of a exemplary system to generate electricity using a flow of air according to the present disclosure.

In various embodiments of systems 100 of the present disclosure, a control board 440 could be used monitor basic parameters of system 100 and allow the appropriate response(s). For example, vertical shaft 108 and/or control board 440 would host a transducer device 442, as shown in the component block diagram of FIG. 1F, that will generate pulses equivalent to rpms and can be converted to amps and volts equivalents. Control board 440 (and/or componentry connected thereto) could then operate to monitor shaft 108 speed, voltage, current and position of several components.

Additionally, several "fail safe" features may be included and monitored by control board 440 as described herein. For example, wind break drum 306 may "lock" in the closed position. Several parameters may cause wind break drum 306 to close, including, but not limited to, (a) over-wind for an extended period of time to initiate a safety shut down, and (b) icing or other encumbrances that may cause system 100 to lock up could initiate a "lock" of wind break drum 306. Such parameters, in various embodiments, may be initiated/integrated with the electronic clutch assembly (clutch 132). For example, an in at least one embodiment, when at less than 3 mph, clutch 132 could disengage allowing components of system 100 to free wheel. If said components do not free wheel and immediately goes to 0 rpm, components of system 100 (such as control board 440) could initiate a "time out" or shut down. Wind sensors/low end strain gauges, for example, could reside in the wind funnel assembly 200 to monitor wind speed. If wind speed is zero and there is no rotation, system 100 could "see" a lock-up of said components and go into shut-down and initiate an alarm/indicator.

In at least one embodiment, and as shown in the exploded view of various components of a partial exemplary system 100 of the present disclosure shown in FIG. 5A, wind break drum 306 is mounted to vertical tie bars 205, using eight pins 502, namely four pins 502 at the top and four pins 502 at the bottom positioned equidistant to each other, respectively. Each pin 502, in such an embodiment, is mounted directly to wind break drum 306 and projects horizontally 90 degrees to the side as shown in FIG. 5A. Pins 502 slide within corresponding horizontal slides 504 that are mounted onto vertical tie bars 205 with four horizontal slides 504 at the top and four horizontal slides 504 at the bottom. Horizontal slides 504, in such an exemplary embodiment, are the tracks that pins 502 rest in and move in. In combination with a wind break positioning device, such as a solenoid or servo motor 508 mounted at the top of vertical brace 506, wind break drum 306 is pushed to either partially or completely block wind from entering nozzles 207 through wind break aperture 308. Wind break drum 306, in at least one embodiment, has at least one spring 510 that returns the wind break drum 306 to a "null" position or the fully open position.

As the wind speed increases during operation of an exemplary system 100 of the present disclosure, the (rpm), revolutions per minute increases. An alternator/generator 110 coupled to a vertical shaft, as shown in FIGS. 1A and 2A, generates a current directly proportional to the rpm of vertical shaft 108. As the current rises beyond a present threshold of an over-wind condition, positioning device such as a solenoid or servo motor 508 operates to push wind break drum 306 so wind break aperture 308 is in a proportionally closed position. As the wind subsides, and in an exemplary embodiment, spring 510 returns wind break drum 306 and associated wind break aperture 308 to a full open position.

In at least one embodiment, one spring 510 is mounted on each pin 502 for responsiveness and balance.

Figure 5B:
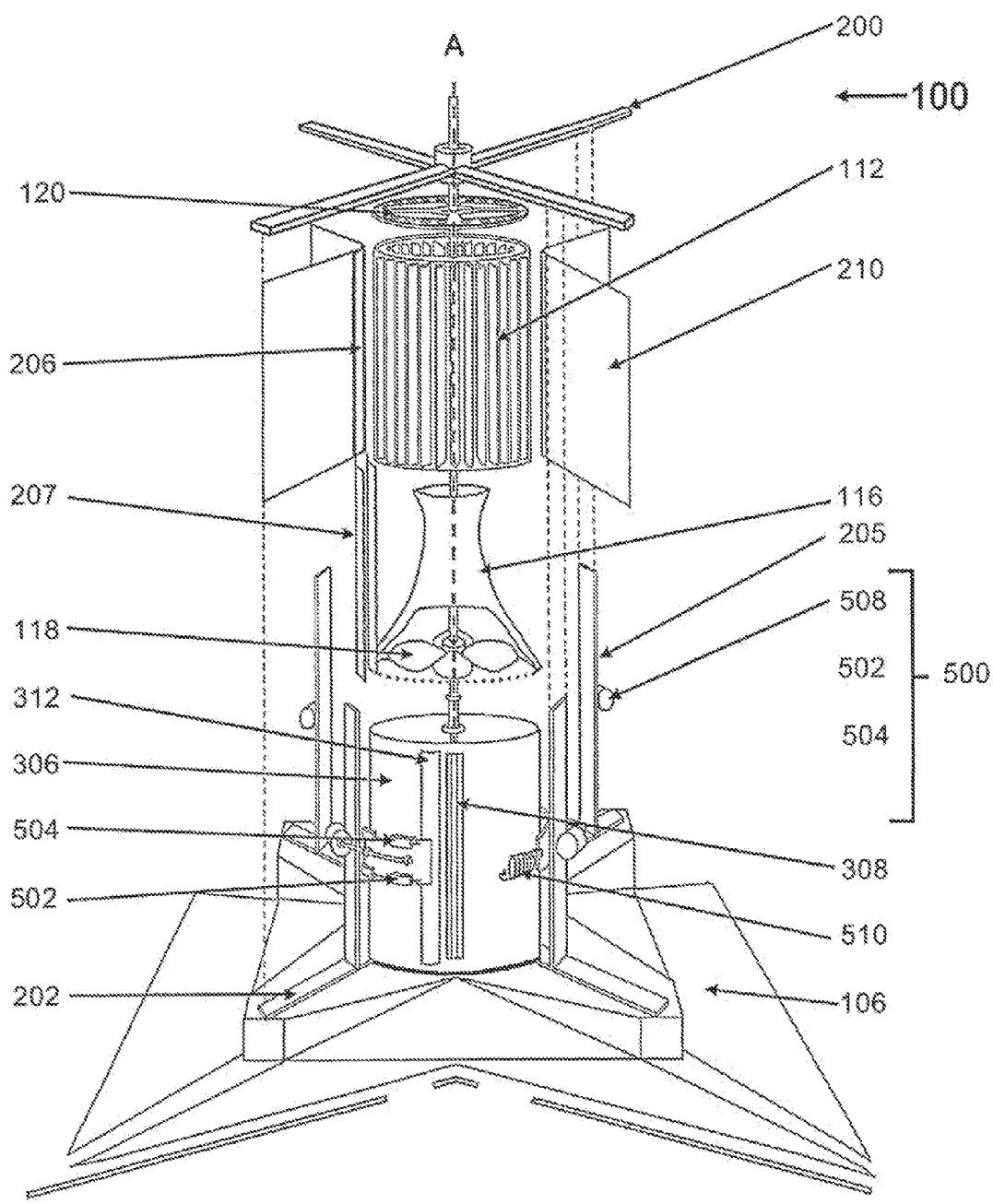

In another exemplary embodiment of a system 100 of the present disclosure, system 100 further comprises at least one wind break drum 306 as shown in FIGS. 3, 5A, and 5B. Wind break drum 306, in an exemplary embodiment, is a circular drum with four break apertures 308 corresponding to vertical slits 206 in wind funnel 204. Wind break drum 306 occupies the next concentric ring outbound from the center axis A-A after cylindrical blade drum 112. In such an exemplary embodiment, wind break drum 306 remains stationary and does not rotate. Instead, wind break shutters 312 coupled to electronic positioning device, such as a solenoid or servo motor 508 (using four wind break shutters 312 coupled to electronic positioning device such as a solenoid or servo motor 508, for example) move to close wind bread apertures 308 as shown in FIG. 5B. As the current (air flow) rises beyond a present threshold of an over-wind condition, electronic positioning device such as a solenoid or servo motor 508 operates to push wind break shutter 312 so wind break aperture 308 is in a proportionally closed position. As the wind subsides, and in an exemplary embodiment, spring 510 returns wind break shutter 312 and associated wind break aperture 308 to a full open position.

In at least one embodiment, one spring 510 is mounted on each pin 502 for responsiveness and balance. An exemplary exterior housing assembly 104 of the present disclosure may comprise the following components and may be secured to central platform 404 as follows. For example, and as shown in FIG. 2A, corners of the cupola (namely vertical supports 300 of exterior housing assembly 104) may be fabricated using metal "angle stock." Such corners would then be formed into a box-like configuration by welding, for example, 6" strips of sheet metal (horizontal supports 310 as shown in FIG. 2, of substantial thickness to have the required mechanical properties) on all four sides at the top, thereby joining and forming four equal sides. Such angle stock, as shown in the partial cross-sectional view of a portion of system 100 shown in FIG. 6, may also comprise fabricated grooves 212 running the length of the angle stock (vertical supports 300) from top to bottom that may accommodate wind funnels 204.

In at least one embodiment, wind funnels 204 have flanges 214 on their edges, as shown in FIGS. 2A and 6, running their length from top to bottom and may be mounted by sliding flanges 214 into the grooves 212 of the corner pieces (vertical supports 300) as shown in FIG. 6.

Figure 7:
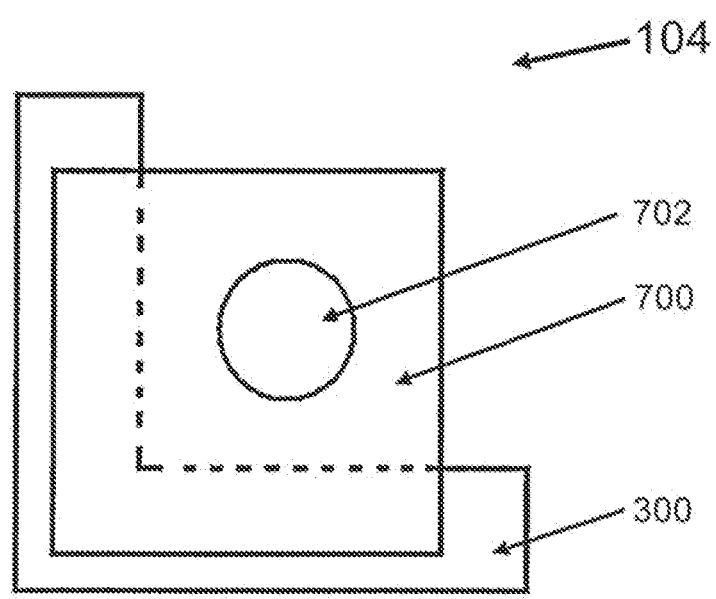
FIG. 7 shows a top-down or bottom-up view of a portion of an embodiment of an exemplary exterior housing assembly according to the present disclosure.

In at least one embodiment of the present disclosure the use of wind funnel 204 using flanges 214, as shown in FIG. 6, or vertical tabs 700, as shown in FIG. 7, are used to connect and stabilize the wind funnels 204 to a custom exterior housing, or cupola, optionally supplied as an factory fabricated accessory or by a builder to accommodate the wind turbine system 100. Furthermore, and in at least one embodiment of a portion of an exterior housing assembly 104 of the present disclosure shown in the top-down view (or mirror-image bottom-up view) shown in FIG. 7, horizontal tabs 700 may be welded onto vertical supports 300, four at the top and four at the bottom. Such horizontal tabs 700 would comprise the mounting surface with a threaded hole 702 defined therein to accept a screw (not shown) running through the cross braces, namely, top cross-member 201 and bottom-cross member 202.

In at least one embodiment, and as shown in the top-down view of a portion of an exterior housing assembly 104 of the present disclosure shown in FIG. 8A, foot plate mounting assembly 800 may be coupled to the bottom ends of vertical threaded rods 900 to facilitate coupling of foot plate mounting assembly 800 to the roof of a building. A hole at the center of central platform aperture 406, as shown in FIGS. 2B and 2C corresponding to the bottom circumference of cone 116 as shown in FIG. 2A, whereby cone 116 sits directly above central platform aperture 406, funnels the hot air from the attic. Bottom-cross member 202, in such an embodiment, joins the top of central platform 404 with integrated scoop assembly 106 as shown in FIGS. 2A, 2B and 2C to form the chamber that encloses and funnels hot air from the attic up through cone 116.

In situations with roofs having a variable pitch where system 100 would be located, mounting any form of exterior housing 104 to such a roof may be performed as follows. The exterior housing assembly 104 would mount to the corners of central platform assembly 404 as shown in FIG. 2A. System 100 would mount to the central platform assembly 404 by securing bottom cross-member 202 to central platform 404 using threaded rods 900. By sliding threaded rod 900 through base mounting holes 401 and joining foot plate assembly 800, the system 100 is mounted to the roof of a building structure 400 as shown in FIGS. 1A, 2A, and 8B.

As shown in the side view of a roof with a portion of system 100 coupled thereto shown in FIG. 8B, threaded rods 900 would mount the exterior housing assembly 104 to central platform 404. Threaded rods 900 would then pass through base mounting holes 401 to foot plate mounting assembly 800. Foot plates 802 act as a footpad and washer assembly for threaded rod 900 and distribute the overall weight of system 100 upon a building structure 400.

In at least one embodiment, foot plate 802 comprises an 8" square metal plate joined to the bottom of threaded rod 900. In at least one embodiment, foot plate mounting assembly 800 also has a second corresponding foot plate 802 on the underside of the roof decking to complete mounting of the assembly 800 to the roof of a building structure 400.

Figure 9A:
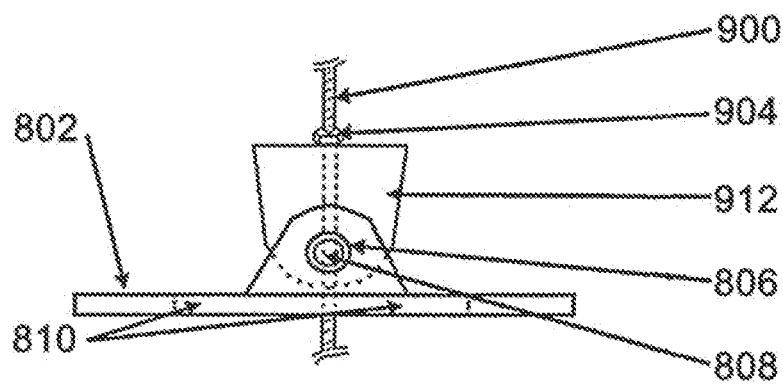
FIG. 9A shows a side view of an embodiment of a portion of an exemplary vertical support foot plate mounting assembly according to the present disclosure.
Figure 9B:
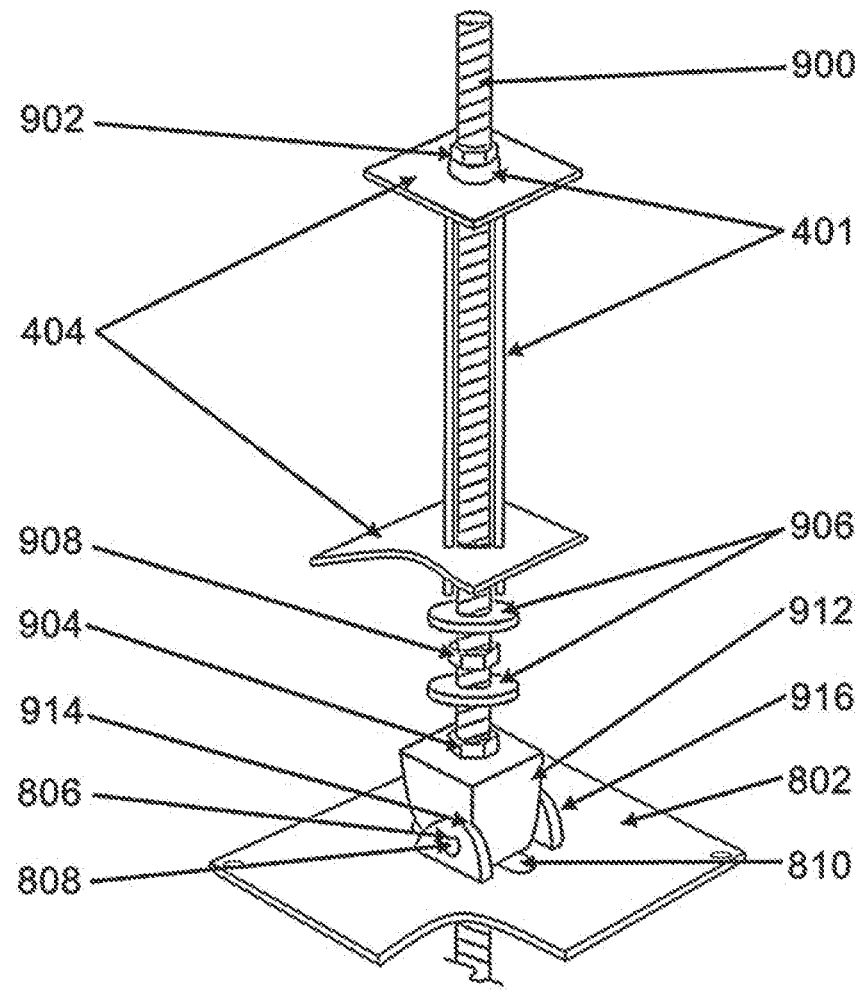
FIG. 9B shows a side view of an embodiment of an exemplary foot plate mounting assembly and threaded rod attachment assembly according to the present disclosure.

In one exemplary embodiment as shown in the top view 2B, side view 2C and partially exploded view 8B of a portion of the central platform 404, threaded rod 900 passes through mounting hole 401 (an effective tubular sleeve) as shown in FIG. 8B. Foot plate 802 may comprise an attachment portion 804, as shown in FIG. 8A, defining a pin aperture 806 to accept a roof pin 808 therethrough, forming a pivot axis for foot plate 802 to rotate along a single axis and align with the angle of building structure 400 as shown in FIGS. 8A, 8B, 9A, and 9B. Pin aperture 806 may be defined within, for example, a tubular sleeve (not shown) which itself may be enclosed except, for example, a nut bolted to a plate enclosing the tubular sleeve. Threaded rod 900, in at least one additional embodiment, may be coupled to foot plate 802 as described below. An additional view of a portion of a threaded rod 900 of an exemplary mounting assembly 800 of the present disclosure is shown in the exploded view of an exemplary foot plate mounting assembly 800 as shown in FIG. 9B. As shown in FIGS. 2C and 8B, a threaded rod 900 is shown running through tubular sleeve (hole 401).

In at least one example, threaded rod 900 has a diameter of 0.5". Threaded rod 900, as shown in FIG. 9B, may be positioned through a tubular sleeve 401. Tubular sleeve, in such an embodiment, is the hole 401 embedded in the corners of central platform 404, whereby the tubular sleeve aperture is large enough to allow free passage of threaded rod 900 therethrough.

Threaded rod 900, top to bottom, may be threaded or passed through fixed reverse nut 902 which is welded at the top of the tubular sleeve (hole 401) onto central platform 404. A second adjustable nut 908 may affixed to threaded rod 900 below the bottom of the tubular sleeve (hole 401). In addition, a foot plate wedge washer 920, as shown in FIG. 8B, may be used along with adjustable nut 908 to provide support to an angled roof, as foot plate wedge washer 920 has an angled profile, as shown in FIG. 8B, A third nut 904 may be affixed to the top of foot 912. Additionally, threaded rod 900 passes through washers 906, through foot 912, through foot plate aperture 810 and into holes through roof of a building structure 400 to mount the foot plate mounting assembly 800.

Washers 906 and a bottom adjustable nut 908 may be positioned around and affixed to threaded rod 900 below the bottom of the tubular sleeve (hole 401) to make height and alignment adjustments. Movement of adjustable nut 908 causes maximum movement of the central platform due to the actions of reverse nut 902 and standard threaded nut 904. The purpose of the regular and reverse threads is to maximize movement of the threaded rod 900 with minimum turns of adjustable nut 908. Foot 912, as shown in FIG. 9B, couples to foot plate 802 by way of a roof pin 808 positioned through a first foot wall 914 and into foot 912 on one side, and through second foot wall 916 and into foot 912 on the other side. Threaded rod 900 may then have free movement side to side by pivoting within elongated plate aperture 810 defined within foot plate 802 and through a hole drilled into the roof decking.

Further adjustment of adjustable nut 908 adjusts the length of threaded rod 900 below the bottom of tubular sleeve 401, with the net result being that the entire assembly including exterior housing assembly 104 can be leveled by using the adjustments on all four foot plate mounting assemblies 800.

Exterior housing assembly 104, as shown in FIG. 2A, may further comprise a housing roof assembly 134. In at least one embodiment, housing roof assembly 134 comprised of a lower pyramid 136 defining a pyramid aperture 138 therethrough, and further comprised of an upper pyramid 140 coupled to the lower pyramid 136 by way of four pyramid legs 142. Housing roof assembly 134, when positioned at the top of exterior housing assembly 104, allows air within system 100 to escape, and as shown in FIG. 2A, prevents rain and/or show from entering the top of exterior housing assembly 104. The exterior housing assembly 104 can then be mounted to a building structure 400 using the same threaded rods 900 to adjust the effective length of each vertical support 300.

A similar metal plate to foot plate 802 may then be placed on the underside of building structure 400, effectively becoming a large washer to distribute the weight and force of system 100. Additionally, and by way of example, a second lock washer, one or more nylon spacer washers, and an additional nut completes the process of affixing the exterior housing assembly 104 to building structure 400.

In various embodiments, all electronic components may be positioned within the interior of central platform 404, which would eliminate the need for taking the vertical shaft 108 through the roof and into the attic of a building structure 400. Placement of clutch 132, alternator/generator 110, and/or other componentry of system 100 would allow system 100 to be mounted on any type of roof including a flat roofs without the need for a space under the building structure 400. In such an embodiment, the only components exiting system 100 would be a set of wires which could take any appropriate path necessary to match up to the controller and other electronic control systems.

Figure 10:
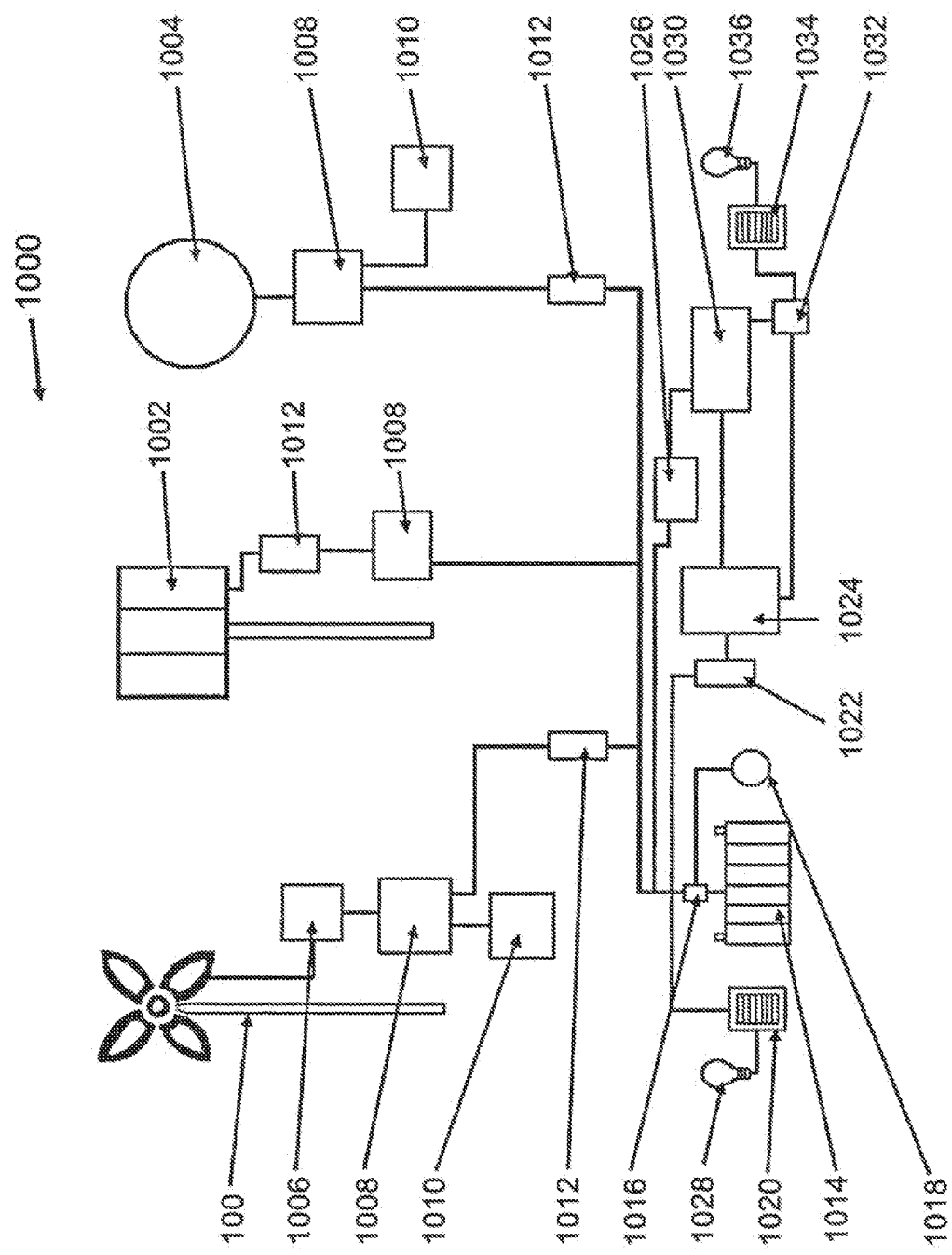
FIG. 10 shows an embodiment of an exemplary building power system diagram incorporating an exemplary system of the present disclosure.

As shown in the exemplary building power system diagram shown in FIG. 10, a system 100 of the present disclosure may comprise a portion of an overall power arrangement 1000. system 100, shown as a wind generator and tower in FIG. 10, is one of at least three exemplary power sources along with solar panel or array 1002 and auxiliary power source 1004, such as, for example, a water generator. Each of system 1000, solar panel or array 1002, and auxiliary power source 1004 may be electrically coupled to a lightning arrestor 1006, a charge controller 1008, a diversion load 1010, and/or a DC fuse or breaker 1012.

One or more of the foregoing components may be electrically coupled to a battery bank 1014 (such as a lead-acid deep charge battery or other chargeable batteries suitable for such an application), shunt 1016, system meter 1018, DC fuse panel or breaker box 1020, DC fuse 1022, AC inverter 1024, and/or an auxiliary battery charger 1026, and may operate one or more DC loads 1028. One or more of the foregoing components, shown as electrically coupled to one another by way of DC wiring in FIG. 10, may further be coupled to an engine generator 1030, an AC transfer switch 1032, and/or an AC fuse panel or breaker box 1034, and may operate one or more AC loads 1036. These latter components are shown in FIG. 10 as being electrically coupled to one another using AC wiring. Power arrangement 1000 is merely one of many exemplary arrangements of power generation sources, such as system 100, with commercial and/or residential electrical demands.

Figure 11:
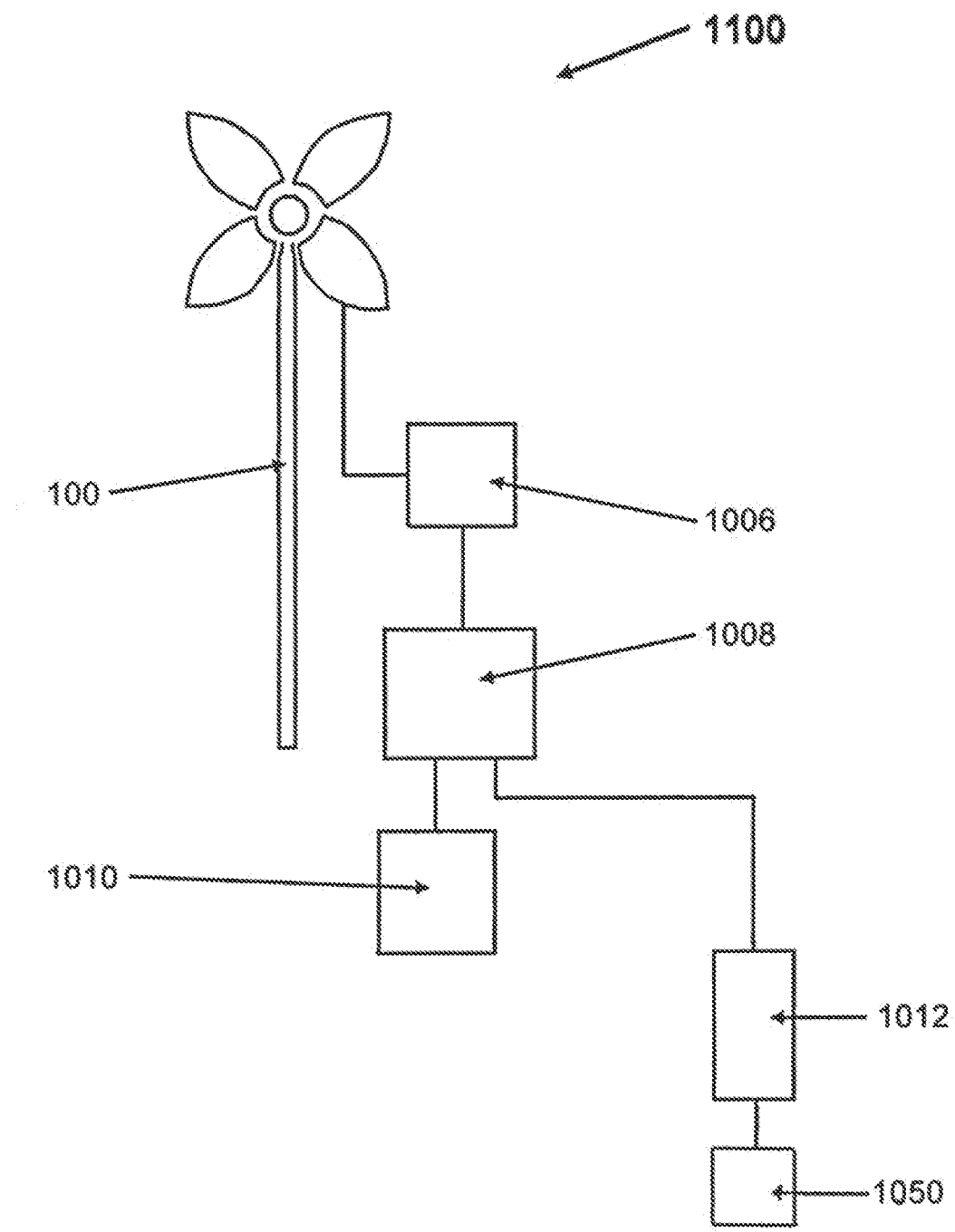
FIG. 11 shows a diagram of an embodiment of an exemplary wind power subsystem according to the present disclosure.

An exemplary wind power subsystem of the present disclosure is shown in the diagram shown in FIG. 11. As shown in FIG. 11, exemplary wind power subsystem 1100 comprises an exemplary system to generate electricity using a flow of air (system 100) electrically coupled to a lightning arrestor 1006, a charge controller 1008, a diversion load 1010, and a DC fuse or breaker 1012.

Additional exemplary wind power subsystems 1100 and/or systems 100 of the present disclosure may include additional other components as referenced herein or fewer components than those shown in FIG. 11. For example, and as shown in FIG. 11, system 100/subsystem 1100 may have one or more electrical storage systems 1050 coupled thereto, which may comprises a battery bank 1014 as shown in FIG. 10, and/or any other number of components capable of storing electricity, including electricity that may be generated using one or more systems 100 and/or subsystems of the present disclosure. Such electrical storage systems 1050, in various embodiments, are capable of storing and distributing electrical power from a number of sources, including wind and solar, and may include "super capacitors" that act as extremely efficient long-term storage systems with negligible losses.

In addition, the control systems that take a AC or DC charge (primarily DC charge) from the energy source (such as system 100) operate to regulate the electrical output from system 100. The control system, in various embodiments, comprises multiple inputs capable of taking inputs from several sources; wind and solar, for example. The control system also has electronics, loads, and optionally switching features that take the energy charge directly to a home/building or to a battery backup system. Other embodiments of control systems are operable monitor the charge coming into the energy system and will automatically switch to electricity from the grid if power levels drop below a certain level. Various components shown in FIG. 10, for example, could operate as control systems as generally referenced above.

Figure 12:
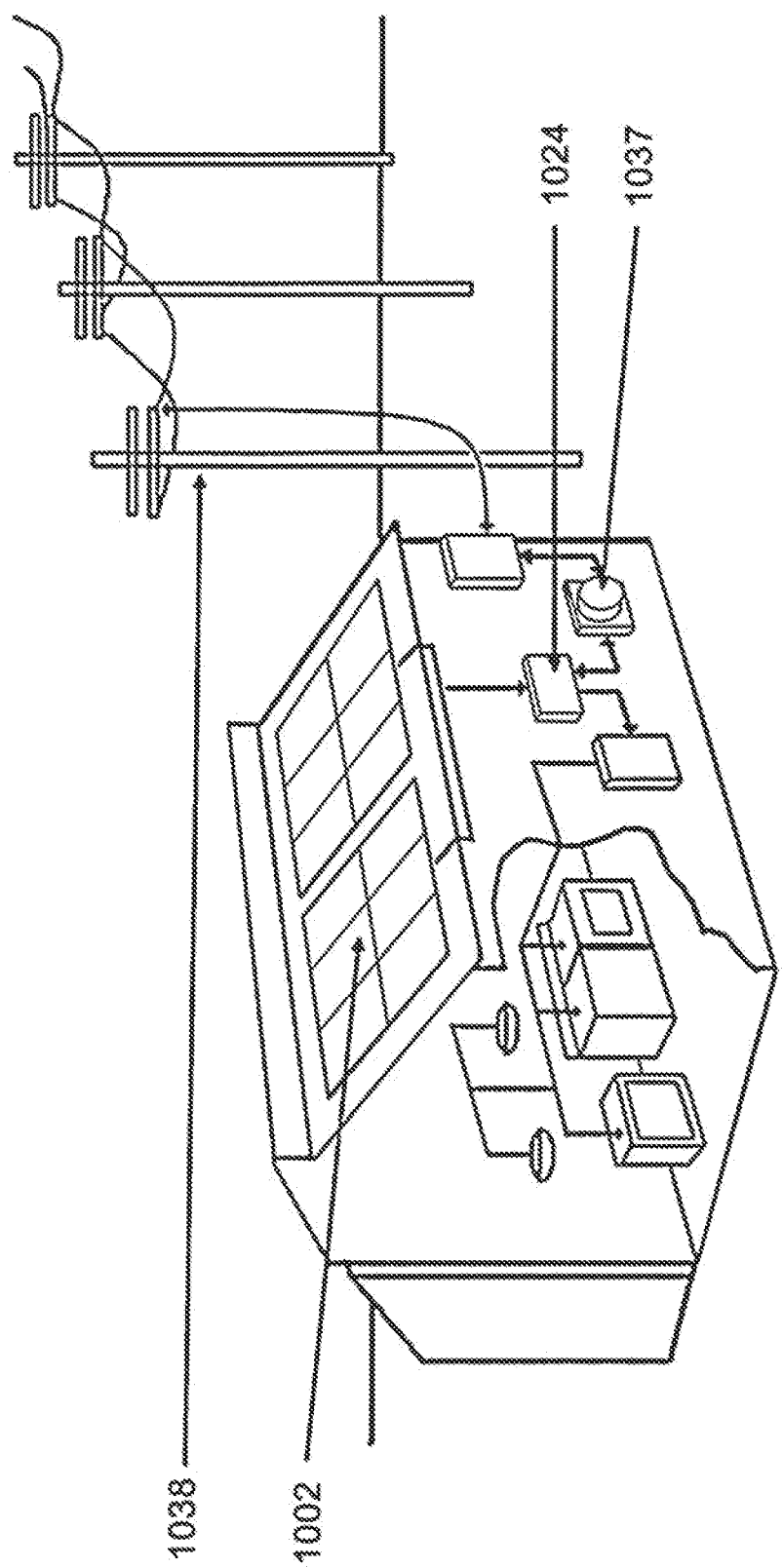
FIG. 12 shows a diagram of an embodiment of a building operably coupled to multiple sources of electricity according to the present disclosure.

A diagram of how an exemplary system 100 of the present disclosure useful with a building operably connected to a utility service is shown in FIG. 12. As shown in FIG. 12, a utility service may provide power to a building, and solar panels (solar panel or array 1002), for example, may provide another source of power. The solar panels shown in FIG. 12, as well as system 100 and/or a water generator 1004 as referenced in FIG. 10, may be used as sources of electricity along with the utility service 1038 shown in FIG. 12. As referenced in FIG. 10 and as shown in FIG. 12, various other components, such as an inverter (AC inverter 1024) and a meter 1037 may be used to facilitate use of various sources of electricity.

Figure 13:
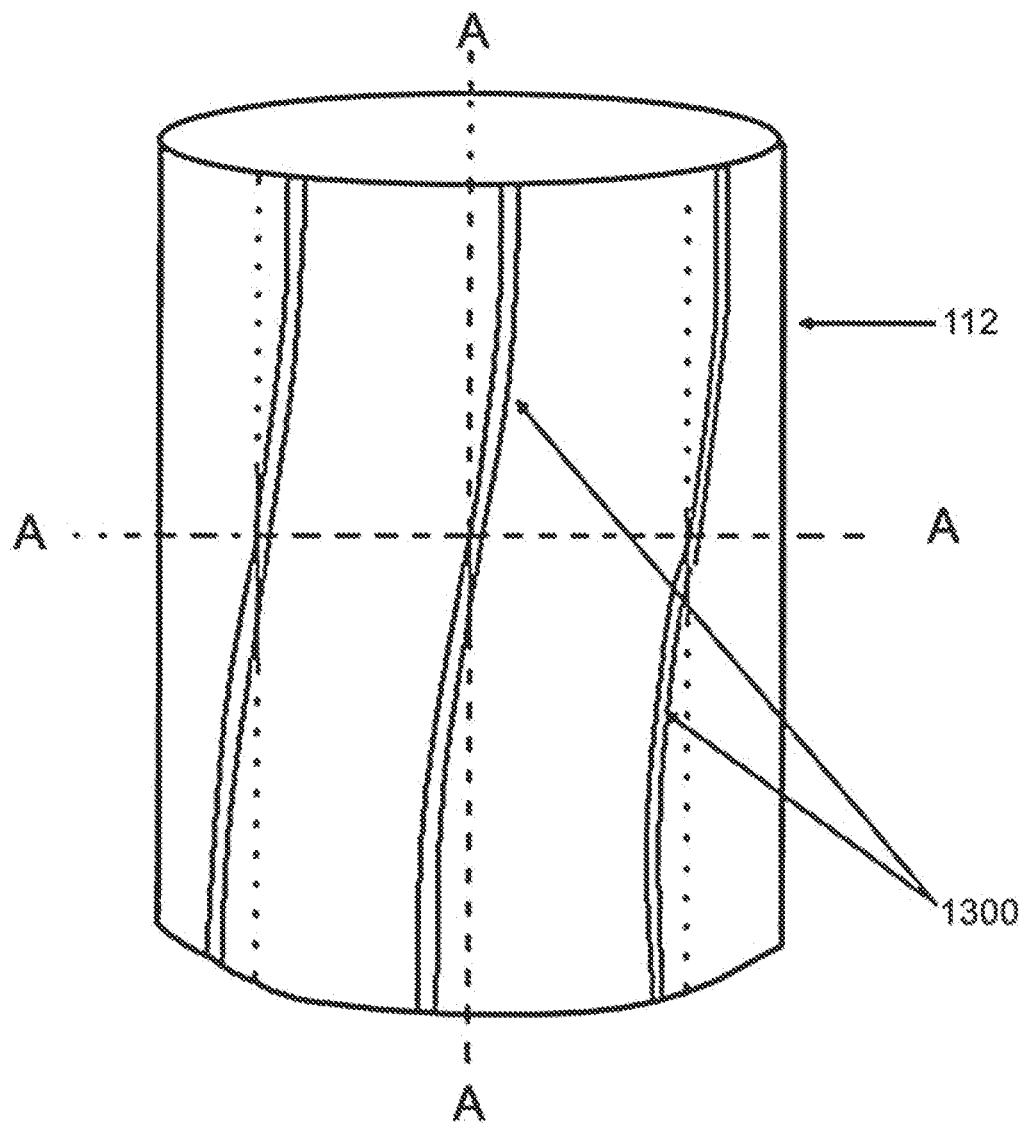
FIG. 13 shows a perspective view of an additional embodiment of an exemplary cylindrical blade and blade drum according to the present disclosure.

In at least one additional embodiment of a cylindrical blade drum 112 of the present disclosure, and should the airfoil design described above and shown in FIGS. 1A and 2A be insufficient to provide projected lift efficiencies, an alternate exemplary cylindrical blade drum 112 design comprises a configuration of one or more inversely scooped vertical blades 1300 with an inside edge that rotates in a relatively slight helical movement around a central axis as shown in the perspective view of an exemplary cylindrical blade drum 112 shown in FIG. 13. The total rotation of the axis running through the center of the cross section of such a vertical blade 1300 would be approximately 45 degrees from the top to the bottom, allowing for a gradual sloughing off of air as it exits through the vertical blades 1300 rotating slightly past the surface of the blade then up and out of the cylindrical blade drum 112.

In various embodiments of systems 100 of the present disclosure, components of said systems may be placed within system 100, within an attic of a building structure, in other areas within a building structure (room and/or basement), or external to a building structure as shown in FIG. 15.

Figure 18:
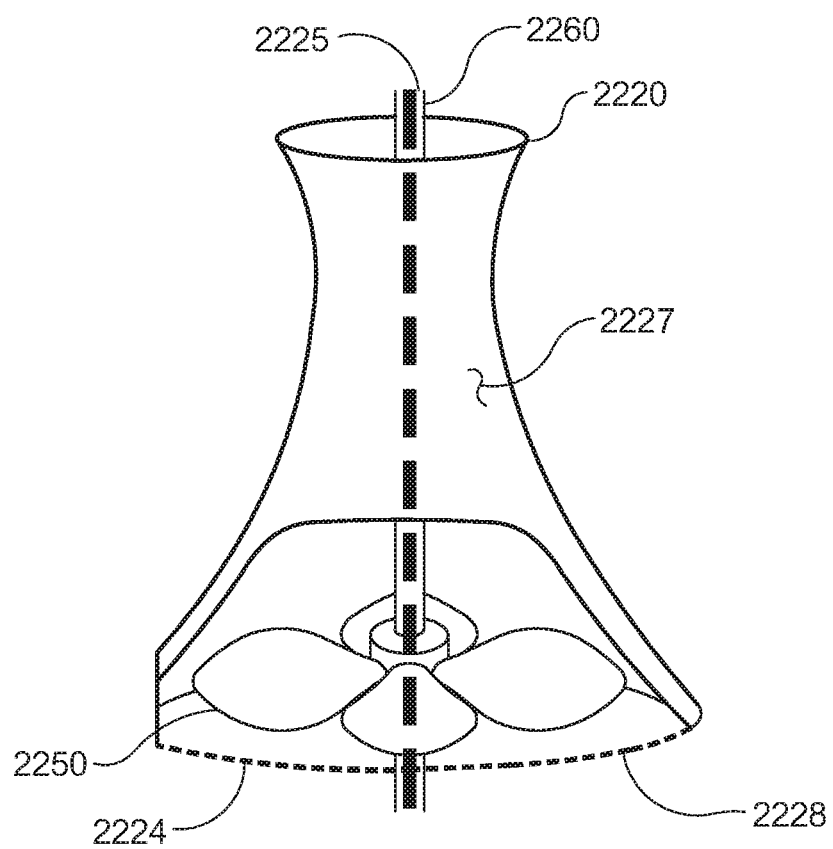
FIG. 18 shows a side view of an alternative embodiment of an exemplary conical fan according to the present disclosure.

The present disclosure further includes embodiments of a fan capable of redirecting a fluid flow, while introducing minimal turbulence and back pressure, and simultaneously generating rotational momentum from the fluid flow, and methods for using and constructing the same. According to one aspect of the present disclosure, a conical fan is disclosed. FIG. 16 shows a perspective view of an exemplary conical fan according to at least one embodiment of the present disclosure. As shown in FIG. 16, conical fan 2210 may include a central generally conical support member 2220 with an exterior surface 2227 and a plurality of fan blades 2230 extending therefrom and distributed across the exterior surface 2227 of the cone 2220. In at least one embodiment, the generally conical support member 2220 may be frustoconical, or, in other words, a truncated, right circular cone with a top 2222 at or near the apex of the cone and an opposing base 2224, where the exterior surface 2227 forms straight lines in profile view as shown in FIG. 17. In an alternative embodiment, the exterior surface 2227 of the generally conical support member 2220 may have a concave, parabolic or hyperbolic (though still generally conical) shape as shown in FIG. 18.

Referring to FIG. 17, the cone 2220 may be capable of rotating about a vertical axis 2225 such that the plurality of blades 2230 affect a fluid surrounding the conical fan 2210 to enable a relatively high volume, but relatively low pressure, flow of the fluid. The conical fan 2210 may further be mounted on a vertical shaft 2260 (shown in FIG. 18) disposed on or near the axis 2225, such that rotation of the conical fan 2210 results in rotation of the shaft 2260 and vice-versa. Rotation of the conical fan 2210 may be powered by an external source linked to the shaft 2260. Alternatively, the conical fan 2210 may be driven to rotate by a flow of fluid across the plurality of blades 2230, where rotation of the conical fan 2210 causes rotation of the shaft 2260.

As shown in FIG. 17, the plurality of blades 2230 may encircle the cone 2220 and may be oriented at a uniform, low approach angle such that a continuous, low-resistance flow path 2240 is formed along the exterior surface 2227 of the cone 2220 in a spiral pattern that processes along the vertical axis 2225. Further, the plurality of blades 2230 in concert with the conical shape of the cone 2220 may enable a laminar fluid flow around and along the axis 2225. A laminar fluid flow is advantageous because such a flow provides a uniform pressure gradient with minimal pressure losses as described further herein.

As shown in FIG. 17, each of the plurality of blades 2230 may include a vane or distal portion 2232 integral with a stem or proximal portion 2234, which is attached to the cone 2220. The vane portion 2232 may include a curved, crescent, scythe, or comma-shaped (or other suitably shaped) portion that provides lift and movement to the subject fluid when the fan 2210 is rotated. The vane portion 2232 of each of the plurality of blades 2230 may be similarly sized. Alternatively, the vane portions 2232 of the plurality of fan blades 2230 may vary in size depending on the position of a given vane portion 2232 along the axis 2225. In at least one embodiment, the length or extent of the stem portion 2234 of each of the plurality of blades 2230 may vary among the plurality of blades 2230. In at least one embodiment, the vane portions 2232 of different blades have different shapes.

In at least one embodiment, the stem portion 2234 of blades 2230 arranged near the base 2224 of the cone 2220 may be relatively short or essentially not present. In contrast, the stem portion 2234 of blades 2230 arranged near the top 2222 of the cone 2220 may be relatively long by comparison. As a result, as the diameter of the cone 2220 decreases along the axis 2225 from the base 2224 to the top 2222, the stem portions 2234 of the plurality of blades 2230 may be progressively longer such that the overall diameter of the conical fan 2210, including the cone 2220 and the plurality of blades 2230, is substantially constant from the base 2224 to the top 2222, generally defining a cylinder (especially when rotating) as shown in FIG. 19.

In at least one embodiment to the present disclosure, the cone 2220 may be hollow and include a relatively small upper aperture 2226 at or near the top 2222 and a relatively large lower aperture 2228 at or near the base 2224 of the cone 2220 as shown in FIG. 17. Accordingly, the conical fan 2210 may enable a flow path through the cone 2220 and along the axis 2225 as shown in FIG. 17. In at least one embodiment, the conical fan 2210 may optionally include an internal fan 2250 disposed at or near the base 2224 within the aperture 2228 and oriented horizontally with an axis of rotation parallel to the axis 2225 as shown in FIG. 18. The internal fan 2250 may be mounted to the shaft 2260 and may be a conventional wide prop fan that may operate in at least two modes. First, the internal fan 2250 may be driven to rotate by an external source and thereby force a fluid to flow vertically along the axis 2225 through the cone 2220. In such an embodiment, the internal fan 2250 may draw fluid flow from the lower aperture 2228 and force the flow through the upper aperture 2226. The external source driving the internal fan 2250 via the shaft 2260 may include, but not be limited to, the conical fan 2210, an electric motor, or other external source of torque energy as disclosed herein. Second, the internal fan 2250 may be driven to rotate by a fluid flow moving from the lower aperture 2228 through the upper aperture 2226. For example, hot air rising through the lower aperture 2228 and the upper aperture 2226 may cause the internal fan 2250 to rotate. In such a mode of operation, the internal fan 2250 may add to the rotational momentum generated by the conical fan 2210 and contribute additional power to rotation of the shaft 2260.

Figure 20:
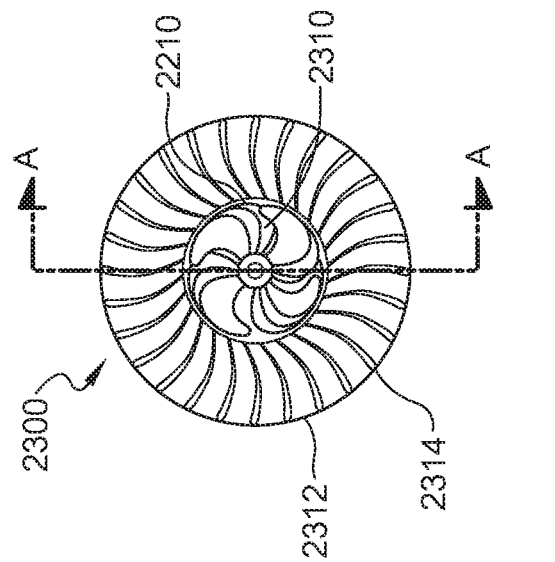
FIG. 20 shows a plan view of an embodiment of an exemplary conical fan positioned within an exemplary cylindrical blade drum according to the present disclosure.

The conical fan 2210 may be used in various applications to facilitate fluid flow and/or generate rotational momentum. For example, at least one embodiment of the conical fan 2210 may be used in connection with a vertical wind turbine. As shown in FIG. 20, the conical fan 2210 may be placed within an internal volume 2310 of a vertical wind turbine 2300. An exemplary wind turbine 2300 may include a cylindrical blade drum 2312 comprising a plurality of vertical blades 2314, wherein each vertical blade 2314 is positioned at or near the external circumference of the cylindrical blade drum 2312. Cylindrical blade drum 2312, when in operation, may rotate about its vertical axis 2325 shown in FIG. 21. In at least one embodiment of a cylindrical blade drum 2312 of the present disclosure, vertical blades 2314 are equally spaced and aligned around the circumference of cylindrical blade drum 2312. Vertical blades 2314 facilitate rotation of cylindrical blade drum 2312 due to fluid flow across the vertical blades 2314.

Figure 21:
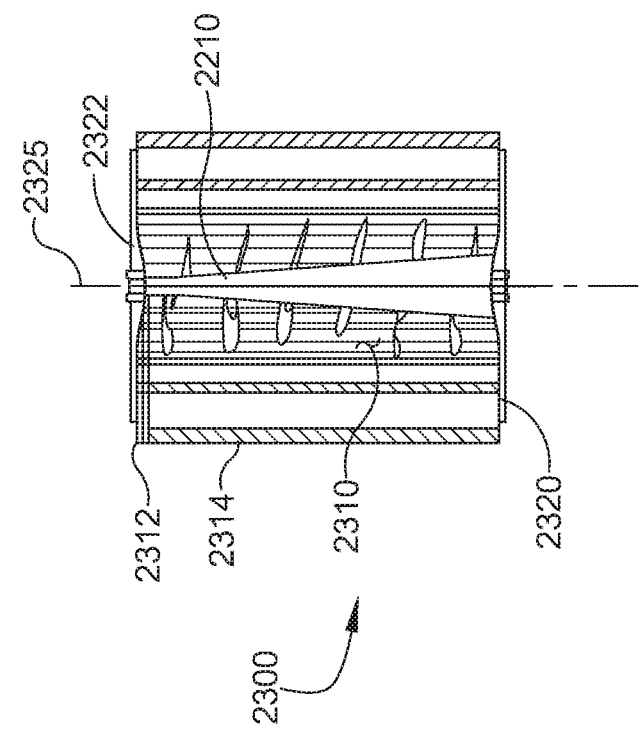
FIG. 21 shows a cross-sectional view taken at the line A-A of FIG. 18 of an embodiment of an exemplary core fan positioned within an exemplary blade drum according to the present disclosure.

In at least one embodiment, each vertical blade 2314 is designed with an aerodynamic configuration for performance and responsiveness to the broadest range of fluid flow conditions, such as air flow from ambient wind, using an effective airfoil design and the angle of each vertical blade 2314. Each vertical blade 2314 responds to the movement of air across its surface similar to the wings of an airplane, which themselves achieve lift by creating negative air pressure on the upper side of the airfoil. Similarly, each vertical blade 2314 of the wind turbine 2300 moves in the direction of negative air pressure as air moves across the surface of the airfoil, whereby each of the plurality of vertical blades 2314 is pushed by the wind to affect rotation of cylindrical blade drum 2312 of the wind turbine 2300. The cylindrical blade drum 2312 may further be linked via a central top hub 2322 and central bottom hub 2320 to the shaft 2260 disposed on the axis 2325 as shown in FIG. 21.

Fluid flow across the plurality of vertical blades 2314 may enter the internal volume 2310 of the wind turbine 2300. If not otherwise directed, the fluid flow into the internal volume 2310 may cause a back pressure that reduces the efficiency of the airfoil design of the vertical blades 2314 due to turbulence introduced into the flow. However, the conical fan 2210 may prevent significant back pressure in the internal volume 2310 and enable a partially or substantially laminar fluid flow out of the internal volume 2310, thereby improving the efficiency of the wind turbine 2300. When positioned within the internal volume 2310 and aligned on the vertical axis 2325, the slope of the exterior surface 2227 of the cone 2220 of the conical fan 2210 may direct fluid flow entering the internal volume 2310 through the plurality of vertical blades 2314 upward along the axis 2325 and out of the internal volume 2310. Further, because the diameter of the cone 2220 is tapered, the cone 2220 occupies a decreasing proportion of the internal volume 2310 as the flow moves upward along the axis 2325, which correspondingly increases the volume available to the fluid flow and impairs an increase in back pressure in the flow. As a result, the cone 220 enables and directs a relatively high volume and low pressure flow out of the internal volume 2310, thereby improving the efficiency of the wind turbine 2300.

The fluid flow directed upward by the cone 2220 may generate a lift force on each of the plurality of fan blades 2230. Each of the plurality of fan blades 2230 may be oriented to generate rotational momentum in the conical fan 2210 from the lift force while also providing a uniform, low angle flow path 2240. The rotational momentum of the conical fan 2210 may have two effects on the fluid flow: first, to power rotation of the shaft 2260 as the conical fan 2210 rotates about the axis 2325 and, second, to pull the fluid flow entering the internal volume 2310 up and out of the wind turbine 2300, thereby preventing back pressure. Thus, the interaction of the fluid flow with cone 2220 and the plurality of blades 2230 results in a relatively low pressure, high volume, and generally laminar flow that aids the efficiency of the cylindrical blade drum 2312 and also contributes the total rotational power of the wind turbine 2300. As a result, both the conical fan 2210 and the cylindrical blade drum 2312 may rotate about the axis 2325 and contribute to powering rotation of the shaft 2260 and improving the efficiency of the wind turbine 2300.

As described herein, in at least one embodiment the conical fan 2210 may have a constant overall outer diameter, including the cone 2220 and the plurality of blades 2230, from the base 2224 to the top 2222 as shown in FIG. 17. When such an embodiment is positioned within the cylindrical blade drum 2312 of the wind turbine 2300 on a shared axis 2325, the conical fan 2210 may enable a minimal and consistent gap between the innermost edges of the plurality of vertical blades 2314 of the cylindrical blade drum 2312 and the outermost tips of the plurality of fan blades 2230 of the conical fan 2210. By minimizing the gap between the cylindrical blade drum 2312 and the conical fan 2210, the constant diameter of the conical fan 2210 may further prevent disruption and turbulence of the flow fluid exiting the cylindrical blade drum 2312 and entering the conical fan 2210. Thus, conical fan 2210 may further improve the efficiency of the wind turbine 2300.

As described herein, in at least one embodiment the cone 2220 may be hollow and include a relatively small upper aperture 2226 at or near the top 2222 and a relatively large lower aperture 2228 at or near the base 2224 of the cone 2220 as shown in FIG. 17. In such an embodiment, the cone 2220 may enable a flow path along the axis 3225 that is segregated from the fluid flow entering the cylindrical blade drum 2312 via the vertical blades 2314. As a result, fluid flow entering the bottom of the internal volume 2310 is prevented from negatively affecting the efficient flow pattern enabled by the conical fan 2210. In applications where the wind turbine 2300 and conical fan 2210 are positioned above a column of rising fluid, such hot air rising from a vented attic space of a building, the cone 2220 prevents interference between the flows that would reduce the overall efficiency of the wind turbine 2300. Further, the internal fan 2250 may be included within the cone 2220 to generate additional rotational momentum from the column of rising fluid, thereby further improving the efficiency of the wind turbine 2300.

The conical fan 2210 may operate in at least five different ways, namely to: (i) deflect fluid flow passing through the vertical blades 2314 up and out of cylindrical blade drum 2312 on the outside of cone 2220 to prevent back pressure and turbulence; (ii) enable a path of least resistance for incoming fluid flow to exit the cylindrical blade drum 2312 by presenting a low approach angle to the incoming flow, enabled by the combination of the conical shape of the cone 2220 with the spiral arrangement of the fan blades 2230; (iii) further enable a power exhaust effect whereby the incoming air flow is pushed to exit the cylindrical blade drum 2312 by the conical fan 2210; (iv) act as a barrier to hot air rising from an attic or other upper portion of a building where relatively hot air accumulates, segregating the rising air from the external air flow to reduce the likelihood of energy loss in wind turbine 2300 through turbulence or back pressure, and (v), where the conical fan 2210 includes an internal fan 2250, direct and pull hot air exiting from the attic or other upper portion of a building through the internal fan 2250 and out the top aperture 2226 through the cone 2220.

Generally, the conical fan 2210 may be used in applications to facilitate fluid flow and/or generate rotational momentum where the conical fan may draw flow into a substantially cylindrical and at least partially enclosed volume. Additional suitable applications may include within a condenser coil subsystem or air handling subsystem of a heating, ventilation, and air conditioning ("HVAC") system. Further, the conical fan 2210 may be capable of acting on various fluids including, but not limited to, air, other types of gases, water, and other types of liquids.

The present disclosure further includes components of various systems to accelerate a fluid flow and methods for using and constructing the same. According to one aspect of the present disclosure, an air flow nozzle assembly is disclosed. FIG. 22 shows a perspective view of a fluid flow nozzle 4040 according to the present disclosure. As shown in FIG. 22, the nozzle 4040 may include a first wall 4042 and an opposing second wall 4044 connected by opposing end caps 4046. The nozzle 4040 may be formed in a generally hexahedral shape, where the first wall 4042 and the second wall 4044 may be significantly longer than the end caps 4046. Likewise, as shown in FIG. 23, the first wall 4042 and the second wall 4044 may be significantly longer than each is wide. The first wall 4042, second wall 4044, and end caps 4046 define a passageway having an inlet 4043 and an opposing outlet 4045 configured to accept a predominately laminar flow at the inlet 4043 and accelerate the flow through the outlet 4045 without materially increasing the turbulence therein.

In at least one alternative embodiment, the nozzle 4040 may form a non-rectangular parallelogram, where the narrow top and bottom ends defined by end caps 4046 may not form right angle corners with the first wall 4042 or the second wall 4044. In such an embodiment, the non-right corners of the nozzle 4040 may enable free dispersal of vortex flow currents exiting the nozzle 4040. Likewise, the width of the nozzle 4040 (i.e., the length of the end caps 4046) may be adapted to hinder the formation of vortices or eddies associated with back pressure within the nozzle 4040 at certain incoming flow conditions, where a wider width is less likely to produce flow irregularities.

The flow nozzle 4040 may be configured to be most effective in distinct prescribed ranges of incoming flow velocity and conditions at the inlet 4043. Within such a prescribed range, the nozzle 4040 may significantly increase the velocity of the flow exiting the nozzle 4040. Conversely, the nozzle 4040 may have only a minimally effect on the velocity of the flow exiting the nozzle 4040 where the incoming flow velocity is outside the prescribed range. For example, in least one exemplary embodiment, the nozzle 4040 may be adapted to increase incoming air velocities within the range of 3-10 miles per hour (mph) by a factor of 250-400% while having a lesser effect upon incoming air velocities outside this velocity range. By affecting only selected ranges of external fluid velocity, embodiments of the nozzle 4040 may be configured to operate most efficiently within the predominate conditions of a given application as described herein. Further, the nozzle 4040 may be capable of affecting various fluids including, but not limited to, air, other types of gases, water, and other types of liquids.

In at least one embodiment according to the present disclosure, the first wall 4042 and the second wall 4044 may have curvilinear shapes that result in a nozzle volume or passageway 4047 of varying widths from the inlet 4043 to the outlet 4045. Accordingly, the nozzle 4040 may be formed in a convergent (i.e., narrowing from the inlet 4043 to the outlet 4045), divergent (i.e., expanding from the inlet 4043 to the outlet 4045), or convergent-divergent (i.e., a combination of convergent and divergent sections) configuration. FIG. 24 shows a cross-sectional view of a convergent-divergent embodiment of the nozzle 4040 having a prescribed resultant flow field vector 4049. As shown in FIG. 24, the nozzle 4040 may include a divergent section at or near the inlet 4043 followed by a convergent section before diverging again at the outlet 4045 in the direction of the vector 4049.

Figure 25A:
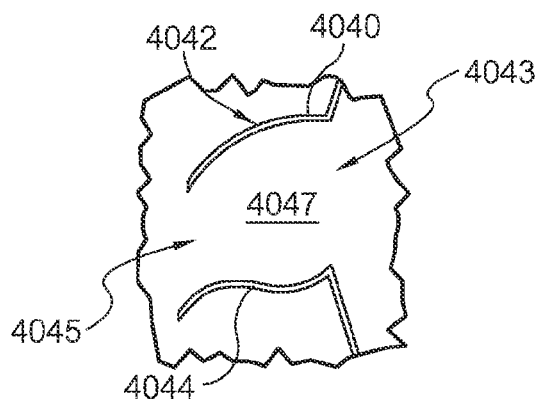
FIGS. 25A, 25B, 25C, 25D, 25E, 25F, 25G, 25H, 25I, 25J, 25K and 25L show plan cross-sectional views of embodiments of nozzles according to the present disclosure.
Figure 25B:
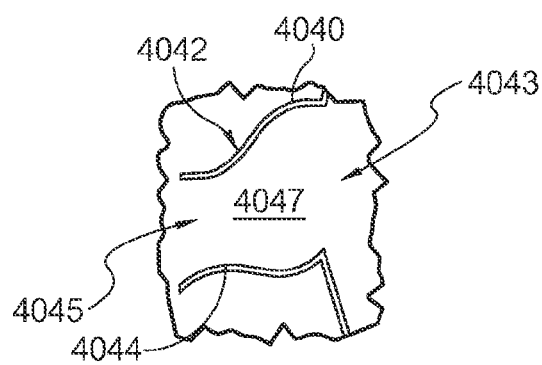
Figure 25C:
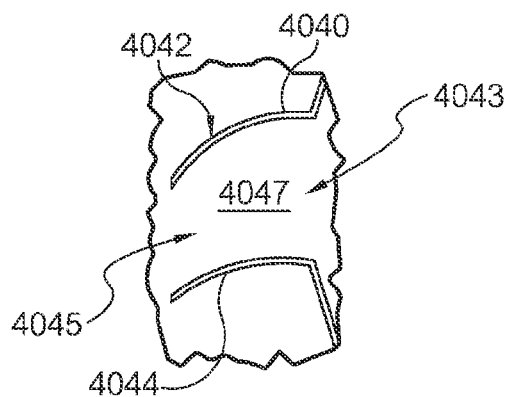
Figure 25D:
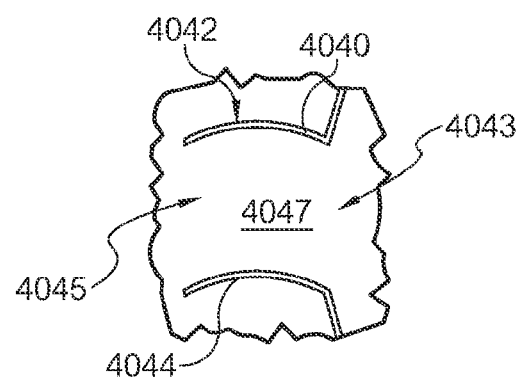
Figure 25E:
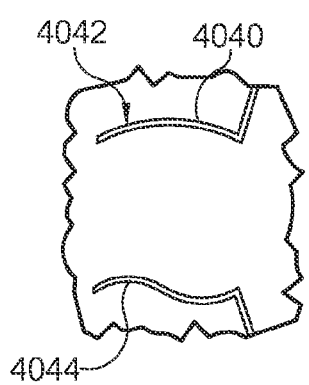
Figure 25F:
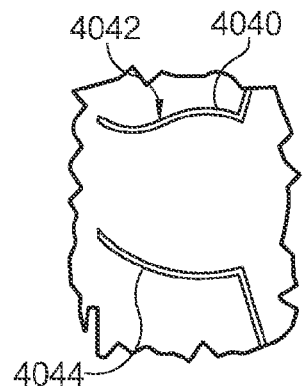
Figure 25G:
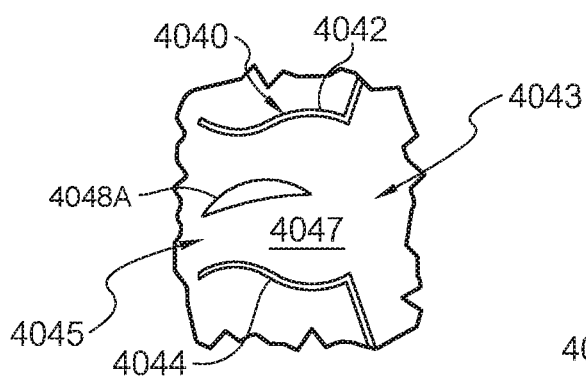
Figure 25H:
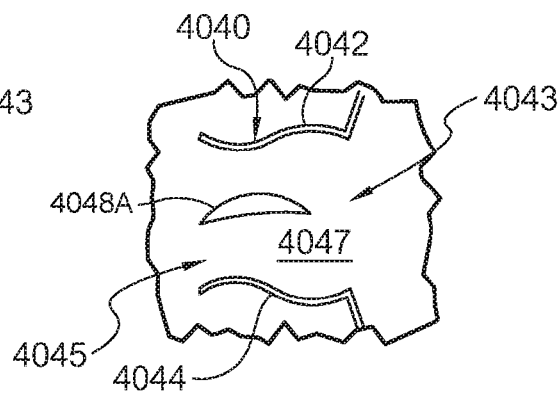

Referring to FIGS. 25A-25L, the first nozzle wall 4042 and second nozzle wall 4044 may each include various configurations, whether convergent, divergent, or convergent-divergent, that result in varying flow characteristics of the flow exiting the nozzle 4040. The flow characteristics may include the angle of the resultant flow field vector 4049 relative to the plane of the inlet 4043. The flow characteristics may further include the degree of turbulence in the flow field, ranging from laminar to turbulent flow. For example, where FIG. 25A shows a nozzle 4040 configured to result in a fully laminar flow field directed at 45°. Nozzle 4040 defines a nozzle volume 4047 with a concave (relative to nozzle volume 4047) wall 4042 and a wall 4044 that is concave near inlet 4043 and convex near outlet 4045. FIG. 25B shows a nozzle 4040 configured to result in a mostly laminar flow field directed at 35°. Nozzle 4040 defines a nozzle volume 4047 with walls 4042, 4044 that are both concave near inlet 4043 and convex near outlet 4045. Likewise, FIG. 25C shows a nozzle 4040 configured to result in a nearly laminar flow field directed at 45°. Nozzle 4040 defines a nozzle volume 4047 with concave wall 4042 and convex wall 4044. FIG. 25D shows a nozzle 4040 configured to result in a wide laminar flow field directed at 20°. Nozzle 4040 defines a nozzle volume 4047 with concave wall 4042 and convex wall 4044. FIG. 25E shows a nozzle 4040 configured to result in a wide laminar flow field directed at 5°. Nozzle 4040 defines a nozzle volume 4047 with a concave (relative to nozzle volume 4047) wall 4042 and a wall 4044 that is concave near inlet 4043 and convex near outlet 4045. FIG. 25F shows a nozzle 4040 configured to result in a wide laminar flow field directed at 3°. Nozzle 4040 defines a nozzle volume 4047 with a concave (relative to nozzle volume 4047) wall 4044 and a wall 4042 that is concave near inlet 4043 and convex near outlet 4045 FIG. 25G shows a nozzle 4040 configured to result in a nearly laminar flow field directed at 35°. Nozzle 4040 defines a nozzle volume 4047 with walls 4042, 4044 that are both concave near inlet 4043 and convex near outlet 4045. Nozzle volume further includes a wedge member 4048 therein having a flat surface facing wall 4044 and a convex surface facing wall 4042. FIG. 25H shows a nozzle 4040 configured to result in a fully laminar flow field directed at 30°. Nozzle 4040 defines a nozzle volume 4047 with walls 4042, 4044 that are both concave near inlet 4043 and convex near outlet 4045. Nozzle volume further includes a wedge member 4048 therein having a flat surface facing wall 4044 and a convex surface facing wall 4042.

Figure 25I:
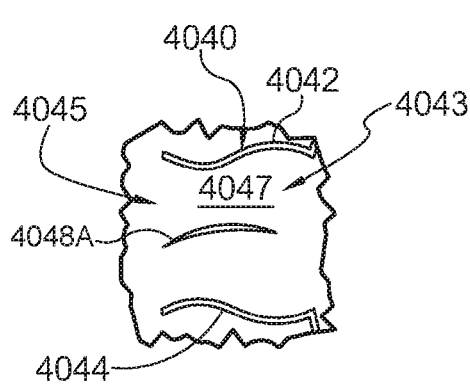
Figure 25J:
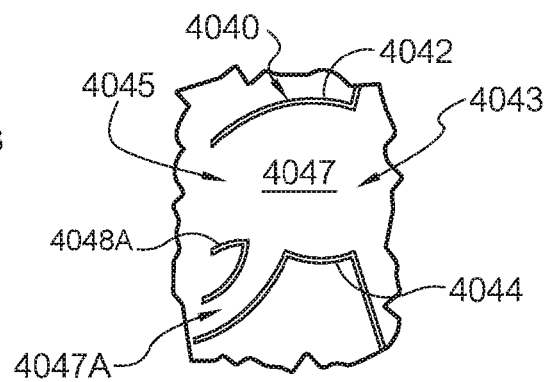
Figure 25K:
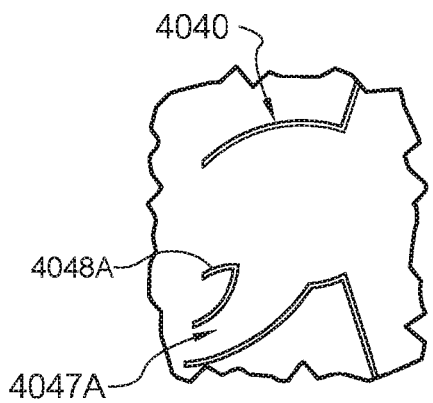
Figure 25L:
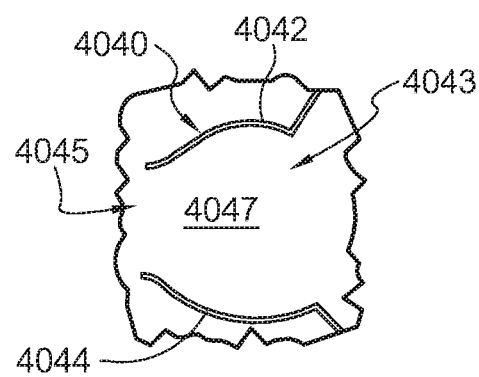

FIG. 25I shows a nozzle 4040 configured to result in a mostly laminar flow field directed at 30°. Nozzle 4040 defines a nozzle volume 4047 with walls 4042, 4044 that are both concave near inlet 4043 and convex near outlet 4045. Nozzle volume further includes a thin wedge member 4048 therein having a concave surface facing wall 4044 and a convex surface facing wall 4042. FIG. 25J shows a nozzle 4040 configured to result in a narrow laminar flow field directed at 10°. Nozzle 4040 defines a nozzle volume 4047 with concave wall 4042 and wall 4044 that is concave near inlet 4043 and convex near outlet 4045. Nozzle volume further includes a secondary nozzle volume or passageway 4047A intersecting and extending away from wall 4044. FIG. 25K shows a nozzle 4040 configured to result in a fully laminar flow field directed at 15°. Nozzle 4040 defines a nozzle volume 4047 with concave wall 4042 and wall 4044 that is concave near inlet 4043 and convex near outlet 4045. Nozzle volume further includes an enlarged secondary nozzle volume or passageway 4047A intersecting and extending away from wall 4044. FIG. 25L shows a nozzle 4040 configured to result in a symmetrical laminar flow field. Nozzle 4040 defines a nozzle volume 4047 with concave walls 4042, 4044 extending generally orthogonally away from inlet 4043 to outlet 4045.

As shown in FIGS. 25G-25K, in at least one embodiment of the present disclosure, the nozzle 4040 may further include a nozzle vane 4048A which further affects the flow field exiting the nozzle 4040. The nozzle vane 4048A may include a solid body positioned between the first nozzle wall 4042 and second nozzle wall 4044 and extending the length of the nozzle walls 4042, 4044 between the end caps 4046. In at least one embodiment as shown in FIGS. 25G-25I, the nozzle vane 4048A may include a solid body that is formed like an airfoil with surfaces that meet at a shallow angle. In at least one embodiment as shown in FIGS. 25J and 25K, the nozzle vane 4048A may include a solid body that reduces the effective area of the nozzle outlet 4045. In such an embodiment, the nozzle vane 4048A may result in a split flow field in which one portion of the field is a narrow laminar flow at a prescribed flow vector angle and the other portion has different flow characteristics at a different flow vector angle.

Figure 26:
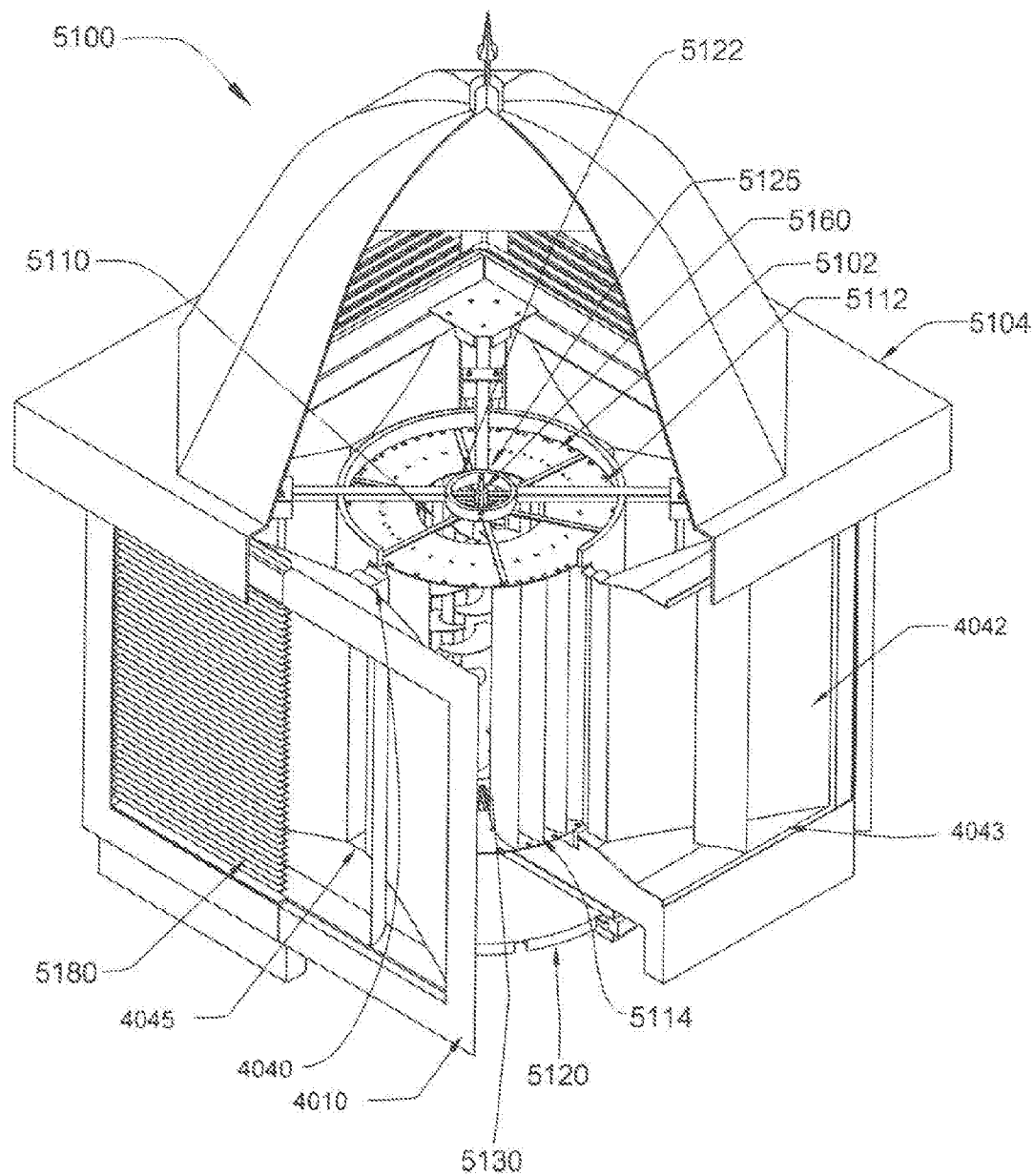
FIG. 26 shows a cut-away perspective view of an exemplary wind turbine system incorporating a flow nozzle according to the present disclosure.

Generally, the flow nozzle 4040 may be used in various applications to accelerate fluid flow and enable laminar flow. Further, the flow nozzle 4040 may be capable of affecting various fluids including, but not limited to, air, other types of gases, water, and other types of liquids. For example, at least one embodiment of the flow nozzle 4040 may be used in connection with a vertical wind turbine to generate electricity. As shown in FIG. 26, a system to generate electricity using a flow of air, such a system 5100, may include an exterior housing assembly 5104 positioned around turbine assembly 5102. The turbine assembly 5102 may include a cylindrical blade drum 5112 comprising a plurality of vertical blades 5114, wherein each vertical blade 5114 is positioned at or near the external circumference of the cylindrical blade drum 5112 and oriented substantially radially, thereby defining an internal volume 5110. The turbine assembly 5102 may further include a conical fan 5130 positioned within the internal volume 5110 of the cylindrical blade drum 5112. In operation, the conical fan 5130 and the cylindrical blade drum 5112 may rotate about a shared vertical axis 5125. In at least one embodiment of a cylindrical blade drum 5112 of the present disclosure, vertical blades 5114 may be equally spaced and aligned around the circumference of cylindrical blade drum 5112.

Vertical blades 5114 facilitate rotation of cylindrical blade drum 5112 via fluid flow, such as air flow or wind, across the vertical blades 5114. Each vertical blade 5114 responds to the movement of air across its surface similar to the wings of an airplane, which achieve lift by creating negative air pressure on the upper side of the airfoil. Similarly, each vertical blade 5114 of the turbine assembly 5102 moves in the direction of negative air pressure (i.e., lift) as air moves across the surface of the airfoil, whereby each of the plurality of vertical blades 5114 is pushed by the air flow to cause rotation of cylindrical blade drum 5112 of the turbine assembly 5102. In at least one embodiment, each vertical blade 5114 is designed with an aerodynamic configuration for performance and responsiveness over the broadest range of flow conditions using an effective airfoil design and the angle of each vertical blade 5114 relative to the axis 5125. As shown in FIG. 26, the cylindrical blade drum 5112 may further be linked via a central top hub 5122 and central bottom hub 5120 to a shaft 5160 disposed on the axis 5125, where the shaft 5160 is mechanically connected to an alternator or generator 5170 (not shown) to produce electricity.

The turbine assembly 5102 operates most efficiently where a steady, high velocity and laminar fluid flow passes over the plurality of vertical blades 5114. The system 5100 may include one or more wind lens assemblies 4010 disposed adjacent the cylindrical blade drum 5112 and mounted to the housing assembly 5104. A steady and laminar flow may be provided by a wind lens assembly 4010 shown in FIG. 26. The wind lens assembly 4010 collects, directs, focuses, and accelerates an external fluid flow, such as ambient air or wind, like an optical lens focuses and intensifies light. The wind lens assembly 4010 is capable of substantially increasing the velocity and volume of the flow exiting the wind lens assembly 4010. The wind lens 4010 likewise operates to redirect and focus air flow, using ambient pressure gradients existing near and around the wind lens assembly 4010.

As shown in FIG. 25, the wind lens assembly 4010 may include a side wall 4042 defining a funnel outlet 4045 therein. The side wall 4042 in various embodiments, may be configured to form a generally outward scoop that facilitates introducing fluid flow into the wind lens assembly 4010, similar to a funnel. In at least one embodiment, the side wall 4042 may include a substantially parabolic shape with the funnel outlet 4045 formed near the focus of the underlying parabola at or near the narrow end of the wind lens assembly 4010. Alternatively, in various embodiments, the side wall 4042 may include, without limitation, a straight, flat, hyperbolic, or convex shape or any suitable shape that is formed with a generally outward scoop that facilitates introducing fluid flow into the wind lens assembly 4010 and directing the flow toward the funnel outlet 4045. The edges of the side wall 4042 may define a funnel inlet 4043 through which an external incoming fluid flow is collected, directed, focused, and accelerated toward the funnel outlet 4045.

The system 5100 may further include one or more screens 5180 positioned adjacent the funnel inlet 4043 and mounted to the wind lens assembly 4010 or the housing assembly 5104. The screen 5180 may prevent intrusion of debris and other foreign matter, such as animals, into the funnel inlet 4043 without significantly affecting the fluid flow.

In at least one embodiment according to the present disclosure, the nozzle 4040 may be disposed between the funnel outlet 4045 of the wind lens assembly 4010 and the cylindrical blade drum 5112 adjacent the plurality of vertical blades 5114. In such an embodiment, the nozzle 4040 may further accelerate air flow from the funnel outlet 4045 of the wind lens assembly 4010, through the nozzle 4040, and across the vertical blades 5114 as described herein. Because the nozzle 4040 enables a steady, high velocity, and laminar flow, energy from air flow is efficiently converted into a lift force against the vertical blades 5114, thereby causing rotation of the cylindrical blade drum 5112 and the shaft 5160 to produce electricity. In at least one embodiment, the nozzle 4040 may be attached to the side wall 4042 of the wind lens assembly 4010 such that a continuous flow path is maintained from the funnel inlet 4043, through the funnel outlet 4045 and through the nozzle 4040 and none of the fluid flow may leak therebetween. Alternatively, the nozzle 4040, in various embodiments, may be formed integral with the wind lens assembly 4010 without the need for a separate nozzle 4040 part.

In at least one embodiment, the height of the nozzle 4040 may correspond to the height of the funnel outlet 4045, which may correspond to the height of the vertical blades 5114 of the cylindrical blade drum 5112. Similarly, the width of the nozzle 4040 may correspond to the width of the funnel outlet 4045, which may be no wider than one to two vertical blades 5114 side by side. Accordingly, the nozzle 4040 may accelerate air flow from the funnel outlet 4045 across no more than two vertical blades 5114 at a time while passing through the cylindrical blade drum assembly 5112. In at least one embodiment, the nozzle 4040 may accelerate air flow from the funnel outlet 4045 across one vertical blade 5114 at a time while passing through the cylindrical blade drum assembly 5112.

The system 5100 may include a plurality of nozzles 4040 positioned within the housing assembly 5104 between the outer diameter of the cylindrical blade drum 5112 and a plurality of wind lens assemblies 4010 as shown in FIG. 25. In an exemplary embodiment comprising four nozzles 4040, the four nozzles 4040 may surround the cylindrical blade drum 5112 and be positioned between the four wind lens assemblies 4010, whereby each of the four wind lens assemblies 4010 occupies 90 degrees of a 360 degree perimeter as shown in FIG. 26. In at least one embodiment, the four wind lens assemblies 4010 and four nozzles 4040 are fixed in position, and the combined effect of the configuration is to capture air flow from 360 degrees. One skilled in the art having the benefit of this disclosure may recognize that other configurations of varying numbers of wind lens assemblies 4010 and nozzles 4040 may be used to capture air flow from 360 degrees.

The nozzle 4040, in various embodiments, may be molded, stamped, or formed by any suitable process that results in the desired configuration as described herein. While various embodiments of systems to focus and accelerate a fluid flow of air and methods for using and constructing the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. Indeed, this disclosure is not intended to be exhaustive or to limit the scope of the disclosure.

FIG. 27 illustrates a collapsed or embedded brushless induction 'pancake' generator 6000 for use with the above-described wind turbine systems. The generator 6000 includes a main stator 6010, windings 6020 and a central shaft 6030. An exciter assembly 6040 including a stator 6045 and exciter armature 6050 are recessed at least partially within the volume defined by the stator 6010 and windings 6020.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

The invention claimed is:

1. A system to generate electricity using a flow of air, the system comprising:
   a plurality of vertical blades disposed radially along an outer circumference of a cylindrical blade drum, wherein the plurality of vertical blades encircle an internal volume;
   a conical fan disposed within the internal volume, the conical fan further comprising:
   a generally conical support member having an exterior surface, a major axis, a base, and a tip; and
   a plurality of generally sickle-shaped blades, each generally sickle-shaped blade attached to the exterior surface, wherein the plurality of generally sickle-shaped blades are positioned with a generally uniform orientation to define a helix for urging air to flow in a spiral pattern up and around the generally conical support member;
   a shaft disposed along the major axis, the shaft having a first end and a second end, the second end operationally connected to a generator, wherein rotation of the cylindrical blade drum or conical fan causes the generator to generate electricity;
   an internal fan positioned at or below the lower aperture, the internal fan capable of rotation to force a fluid along the major axis;
   wherein the conical support member is frustoconical, defining an upper aperture and a lower aperture.

2. The system of claim 1, wherein the conical fan is capable of directing a fluid flow through the internal volume and along the major axis without generating significant back pressure therein.

3. A turbine assembly, the turbine assembly comprising:
   a plurality of vertical blades disposed radially along an outer circumference and defining a cylindrical blade drum having an internal volume; and
   a conical fan disposed within the internal volume, the conical fan comprising:
   a generally conical member having a base and an oppositely disposed tip, an exterior surface, and a major axis; and a plurality of blades extending from the exterior surface;

wherein the plurality of fan blades define a helix for urging a fluid to flow in a generally laminar spiral flow pattern in the direction extending from the base toward the tip;

wherein the conical fan and the cylindrical blade drum are capable of rotation about the major axis.

4. The turbine assembly of claim 3, wherein the conical fan is rotatable to direct a fluid flow entering the internal volume along the major axis without generating back pressure in the internal volume.

5. The turbine assembly of claim 3, wherein the conical fan pulls the fluid flow from the internal volume.

6. The turbine assembly of claim 5, the conical fan further comprising:

an internal fan positioned near the base, the internal fan capable of rotation to force a fluid along the major axis.

7. The turbine assembly of claim 3, wherein the conical member is hollow and truncated to define a frustoconical member.

8. The turbine assembly of claim 3, wherein the conical fan and the cylindrical blade drum are operationally connected to a shared rotating shaft powered by rotation of the conical fan and the cylindrical blade drum.

9. A conical fan assembly, comprising:

a generally conical support member having an exterior surface and a vertical major axis;

a plurality of generally crescent-shaped fan blades extending from the exterior surface of the support member, wherein the plurality of fan blades define a helix configured to urge a fluid to flow in a spiral flow pattern up and around the support member;

an upper aperture and a lower aperture, the lower aperture having a larger diameter than the upper aperture; and an internal fan positioned at or below the lower aperture, the internal fan capable of rotation to force a fluid along the vertical major axis;

wherein the support member is frustoconical and hollow.

10. The conical fan assembly of claim 9, wherein the fan blades are sickle-shaped.

11. The conical fan assembly of claim 9, wherein each respective fan blade has a respective proximal end and a respective distal end; and wherein the respective fan blades are sized and positioned such that the respective distal end of each respective fan blade is a uniform distance from the vertical major axis.

12. The conical fan assembly of claim 11, wherein upon rotation, the respective distal ends define a cylinder.

* * * * *